US007206860B2

(12) United States Patent
Murakami et al.

(10) Patent No.: US 7,206,860 B2
(45) Date of Patent: Apr. 17, 2007

(54) VIRTUALIZATION SWITCH AND STORAGE SYSTEM

(75) Inventors: Toshihiko Murakami, Tokyo (JP); Kenta Shiga, Tokyo (JP); Naoko Iwami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 213 days.

(21) Appl. No.: 10/884,244

(22) Filed: Jul. 1, 2004

(65) Prior Publication Data

US 2005/0267986 A1 Dec. 1, 2005

(30) Foreign Application Priority Data

May 11, 2004 (JP) ............... 2004-140862

(51) Int. Cl.
*G06F 15/173* (2006.01)
(52) U.S. Cl. ............... 709/238; 709/213; 711/5
(58) Field of Classification Search ............... 709/238, 709/213; 711/5
See application file for complete search history.

(56) References Cited

U.S. PATENT DOCUMENTS

| | | | |
|---|---|---|---|
| 5,088,031 A | | 2/1992 | Takasaki et al. |
| 6,085,238 A * | | 7/2000 | Yuasa et al. ............... 709/223 |
| 6,570,875 B1 * | | 5/2003 | Hegde ............... 370/389 |
| 6,754,679 B2 | | 6/2004 | Oheda |
| 6,877,011 B2 | | 4/2005 | Jaskiewicz |
| 2002/0118638 A1 * | | 8/2002 | Donahue et al. ............... 370/229 |
| 2002/0156987 A1 * | | 10/2002 | Gajjar et al. ............... 711/203 |
| 2003/0043805 A1 * | | 3/2003 | Graham et al. ............... 370/392 |
| 2003/0061220 A1 | | 3/2003 | Ibrahim et al. |
| 2003/0131182 A1 * | | 7/2003 | Kumar et al. ............... 711/5 |
| 2003/0217183 A1 | | 11/2003 | Rimmer et al. |
| 2004/0010545 A1 | | 1/2004 | Pandya |
| 2005/0066125 A1 | | 3/2005 | Tanaka et al. |
| 2005/0080992 A1 | | 4/2005 | Massey et al. |
| 2005/0114464 A1 * | | 5/2005 | Amir et al. ............... 709/213 |

FOREIGN PATENT DOCUMENTS

EP  1369772 A2  12/2003

OTHER PUBLICATIONS

"Understanding of 'Network' and 'Virtualization'" *Nikkei IT Professional*, Ryota Tamaki ed., Sep. 2002, pp. 49-51 (2002).
"Realization of Function Intensification and Batch Management by Virtualization of Storage" *Nikkei Windows Pro*, Aug. 2002, pp. 13-15 (2002).
"Overview of the SoftGrid Platform v3," product information Softricity, Inc. Boston, MA (2004).

* cited by examiner

*Primary Examiner*—Rupal Dharia
*Assistant Examiner*—Ranodhi Serrao
(74) *Attorney, Agent, or Firm*—Townsend and Townsend and Crew LLP

(57) ABSTRACT

A virtualization switch virtualizes a data storage area provided by a server device and provides it to a server device. This virtualization switch processes a priority control and a bandwidth control also on the output side to packets which make an access to a virtual volume and which have different demands for a QoS but identical IP headers according to a discrimination result of a TCP connection. Here, the TCP connection is discrimination by managing a TCP source port on the side of the virtualization switch.

20 Claims, 22 Drawing Sheets

FIG.4

ROUTING TABLE

| IP ADDRESS | NEXT HOP ADDRESS | DESTINATION PORT ADDRESS | |
|---|---|---|---|
| 0.0.0.0 | 192.168.1.1 | 192.168.1.11 | 404A |
| 192.168.1.0/24 | 192.168.1.21 | 192.168.1.11 | 404B |
| 192.168.2.0/24 | 192.168.2.21 | 192.168.2.11 | 404C |
| 192.168.1.11/32 | 127.0.0.1 | 127.0.0.1 | 404D |
| 192.168.1.51/32 | 127.0.0.1 | 192.168.1.11 | 404E |
| 192.168.1.52/32 | 127.0.0.1 | 192.168.1.11 | 404F |
| 192.168.1.53/32 | 127.0.0.1 | 192.168.1.51 | 404G |
|  |  |  |  |

FIG.5

QoS MANAGEMENT TABLE 500

| SERVER IP ADDRESS 501 | SERVER SIDE IP ADDRESS 502 | QoS 503 | | VIRTUAL VOLUME ID 504 | FILTERING PROCESSING 505 | |
| --- | --- | --- | --- | --- | --- | --- |
| | | PRIORITY 503A | LIMIT 503B | | AT RECEPTION 505A | AT RECEPTION 505B |
| 192.168.1.2 | 192.168.1.11 | PRIORITY | | V1 | IN01 | OUT01,OUT02 |
| 192.168.1.3 | 192.168.1.11 | NONPRI-ORITY | 1MB/s | V2 | IN02 | OUT03,OUT04 |
| 192.168.1.4 | 192.168.1.14 | | | V3 | | |

VOLUME MANAGEMENT TABLE 600

| 601A | 601B | 601C | 601D | 601E | 602 | 603 | 604 | | 605 |
|---|---|---|---|---|---|---|---|---|---|
| | | | VIRTUAL VOLUME | | STORAGE SIDE PORT IP ADDRESS | STORAGE IP ADDRESS | LUN | | SOURCE TCP PORT |
| ID | IP ADDRESS | TCP PORT | iSCSI NAME | LUN | | | | | |
| V1 | 192.168.1.51 | 3260 | iqn.2001-04.com.abcd: vswitch-sn01-vol1 | LU1 | 192.168.2.11 | 192.168.2.2 | LU1 | LU2 | 31001 ~606A |
| | | | | | 192.168.2.12 | 192.168.2.3 | LU1 | | 32001 ~606B |
| V2 | 192.168.1.52 | 3260 | iqn.2001-04.com.abcd: vswitch-sn01-vol2 | LU1 | 192.168.2.11 | 192.168.2.2 | LU3 | | 31002 ~606C |
| | | | | | 192.168.2.12 | 192.168.2.3 | LU2 | | 32002 ~606D |
| V3 | 192.168.1.53 | 3260 | iqn.2001-04.com.abcd: vswitch-sn01-vol3 | LU1 | | 192.168.2.3 | LU3 | | 32003 ~606E |
| | | | | | | | | | |

FIG.7

FILTERING TABLE AT RECEPTION — 700

| MATCHING CONDITION (701) | PROCESSING (702) | PROCESSING ID (703) |
|---|---|---|
| ( SA OF IP HEADER = 192.168.1.2 )<br>( ADDRESS PORT OF TCP HEADER = 3260 ( iSCSI ) ) | TRANSFER TO PRIORITY QUEUE | IN01 |
| ( SA OF IP HEADER = 192.168.1.3 )<br>( ADDRESS PORT OF TCP HEADER = 3260 ( iSCSI ) ) | TRANSFER TO NONPRIORITY QUEUE AND LIMIT PERFORMANCE TO 1MB/s | IN02 |
|  |  |  |

FILTERING TABLE AT TRANSMISSION

| MATCHING CONDITION | PROCESSING | PROCESSING ID | |
|---|---|---|---|
| ( SA OF IP HEADER =192.168.2.11 )<br>( DA OF IP HEADER =192.168.2.2 )<br>( SOURCE PORT OF TCP HEADER =31001 )<br>(DESTINATION PORT OF TCP HEADER= 3260 ( iSCSI )) | TRANSFER TO PRIORITY QUEUE | OUT01 | 804A |
| ( SA OF IP HEADER =192.168.2.12 )<br>( DA OF IP HEADER =192.168.2.3 )<br>( SOURCE PORT OF TCP HEADER =32001 )<br>(DESTINATION PORT OF TCP HEADER = 3260 ( iSCSI )) | TRANSFER TO PRIORITY QUEUE | OUT02 | 804B |
| ( SA OF IP HEADER =192.168.2.11 )<br>( DA OF IP HEADER =192.168.2.2 )<br>( SOURCE PORT OF TCP HEADER =31002 )<br>(DESTINATION PORT OF TCP HEADER = 3260 ( iSCSI )) | TRANSFER TO NONPRIORITY QUEUE AND LIMIT PERFORMANCE TO 1 MB/s | OUT03 | 804C |
| ( SA OF IP HEADER = 192.168.2.12 )<br>( DA OF IP HEADER = 192.168.2.3 )<br>( SOURCE PORT OF TCP HEADER = 32002 )<br>(DESTINATION PORT OF TCP HEADER= 3260 ( iSCSI )) | TRANSFER TO NONPRIORITY QUEUE AND LIMIT PERFORMANCE TO 1 MB/s | OUT04 | 804D |
| | | | |

FILTERING TABLE AT TRANSMISSION (800)

| MATCHING CONDITION (801) | PROCESSING (802) | PROCESSING ID (803) | |
|---|---|---|---|
| PRIORITY OF TOS OF IP HEADER = 5 (PRIORITY HIGH) (DESTINATION PORT OF TCP HEADER = 3260 ( iSCSI )) | TRANSFER TO PRIORITY QUEUE | OUT11 | 1701A |
| PRIORITY OF TOS OF IP HEADER = 0 (PRIORITY LOW) (DESTINATION PORT OF TCP HEADER = 3260 ( iSCSI )) | TRANSFER TO NONPRIORITY QUEUE | OUT12 | 1701B |
|  |  |  |  |
|  |  |  |  |

VIRTUALIZATION SWITCH AND STORAGE SYSTEM

This application claims a priority based on Japanese Patent Application No. 2004-140862 filed on May 11, 2004, the entire contents of which are incorporated herein by reference for all purpose.

BACKGROUND OF THE INVENTION

The present invention relates to a virtualization technique of a switch base in the SAN (Storage Area Network) and to a technique which controls the quality of services at the time of making an access to a virtual storage.

In the SAN which connects a plurality of computers (or servers) and a plurality of storage systems through a network, there is a technique which virtualizes and utilizes the data storage areas of the storage systems. The virtualization is a technique which causes the plural storage systems connected with the SAN to appear one or more storage systems for the servers. The virtualization of the storage systems is the optimum method for the case, in which the plural storage systems are to be stepwise summarized. In the future, the cost for a manager can be reduced by reducing the storage systems to be managed.

Hereinafter, the virtualized data storage area provided for the servers by the storage systems will be called the "virtual volume", and the data storage area provided by the actual storage systems will be called the "real volume".

The virtualization of the data storage area is performed between the servers and the storage systems. The virtualization of the data storage area is performed: by a method (a first method) using a volume management software in the servers in which server applications are executed; a method (a second method) using a computer which is provided just upstream of the storage system with a plurality of interfaces to connect the storage systems; and a method (a third method) using a network device configuring the SAN. (For example, referred to as: "Understanding of 'Network' and 'Virtualization'" edited by Ryota Tamaki; p. 49 to 51 of Nikkei IT Professional, September, 2002; and p. 13 to 15 of "Realization of Function Intensification and Batch Management by Virtualization of Storage" of Nikkei Windows Pro, August (No. 65), 2002).

SUMMARY OF THE INVENTION

As the network device according to the aforementioned third method, there can be conceived intermediate systems such as the fibre channel switch configuring the SAN or the LAN switch of the case in which the SAN is configured by using an iSCSI (Internet Small Computer System Interface). These intermediate systems will be called the "virtualization switch" in the following description.

In the third method, a virtualization switch provides the server connected with the SAN, with a virtual volume. Specifically, the virtualization switch is looked as a target device from the server utilizing the virtual volume provided by the virtualization switch.

On the other hand, the communication quality and the communication bandwidth demanded by the servers for the networks or the storage systems are different for the servers using the storage systems. These storage systems perform the priority control and the bandwidth control in accordance with the quality of services (hereinafter, called to as the "QoS") demanded, by discriminating the servers making an access to ports. This discrimination of servers is done, for example, by acquiring the addresses of the source servers from the header information of the received packet or by specifying the storage systems connected at the unit of port.

Even in case the storage systems are connected with the servers through the virtualization switch, the addresses of the source servers are contained in the headers of the packets at the ports on the server side of the virtualization switch. As a result, the source servers can be discriminated. Therefore, the virtualization switch can perform the priority control and the bandwidth control for each server.

In the access from the virtualization switch to the storage system, however, the virtualization switch acts as an initiator, and the storage system acts as a target. Therefore, the source address of the header of the packet to be transmitted from the virtualization switch to the storage system stores the address of the source port of the virtualization switch so that it does not contain the address of the server any more.

Depending on the specifications of the virtualization switch, on the other hand, the different virtual volumes can make an access to the ports of the same storage system. Therefore, the storage system cannot discriminate the source server of that packet so that the priority control and the bandwidth control cannot be made for each server by using the existing functions.

In order to solve the above-specified problems, the invention has the following configuration as one embodiment thereof. A virtualization switch virtualizes and provides a server device with a data storage area provided by a server device. In this virtualization switch, packets, which make an access to a virtual volume and which have different demands for a QoS but have identical IP headers, are discriminated with a TCP connection so that a priority control and a bandwidth control are made on the output side. Here, the TCP connection is discriminated by managing a TCP source port on the side of the virtualization switch.

According to the invention, more specifically, a virtualization switch, which relays a packet received from a server device to one or more storage systems and which virtualizes one or more data storage areas of the storage system to provide to the server device, is provided. The virtualization switch is provided with: a volume management table which holds the corresponding relation between the virtualized data storage area (hereinafter, called to as the "virtual volume") to be provided for the server device and the data storage area (hereinafter, called to as the "real volume") assigned to the virtual volume and provided by the storage system with for each server device; a filtering table which makes correspondence between a processing (hereinafter, called to as the "QoS processing") guaranteeing the QoS demanded by the server device assigned to the virtual volume and flow identifying information identifying the flow of the packet to make an access to the real volume assigned to the virtual volume with for each virtual volume; a packet transfer processing means which performs the QoS processing on the received packet, in accordance with the QoS demanded by the server device on the source side, changes the destination of the packet from the virtual volume into a real volume by using the volume management table, and performs the QoS on the changed packet in accordance with the filtering table.

BRIEF DESCRIPTION OF THE DRAWINGS

FIG. 4 is a diagram showing a configuration example of a routing table;

FIG. 5 is a diagram showing a configuration example of a QoS management table;

FIG. 6 is a diagram showing a configuration example of a volume management table;

FIG. 7 is a diagram showing a configuration example of a filtering table at a reception time;

FIG. 8 is a diagram showing a configuration example of the filtering table at a transmission time;

FIG. 20 is a diagram showing a configuration diagram of the filtering table at the transmission time of the second embodiment;

DESCRIPTION OF THE PREFERRED EMBODIMENTS

A first embodiment will be described with reference to FIG. 1 to FIG. 15. The first embodiment will be described on the case, in which QoS such as a priority control or a bandwidth control are controlled at the unit of a virtual volume in a virtualization switch.

Figure 1:
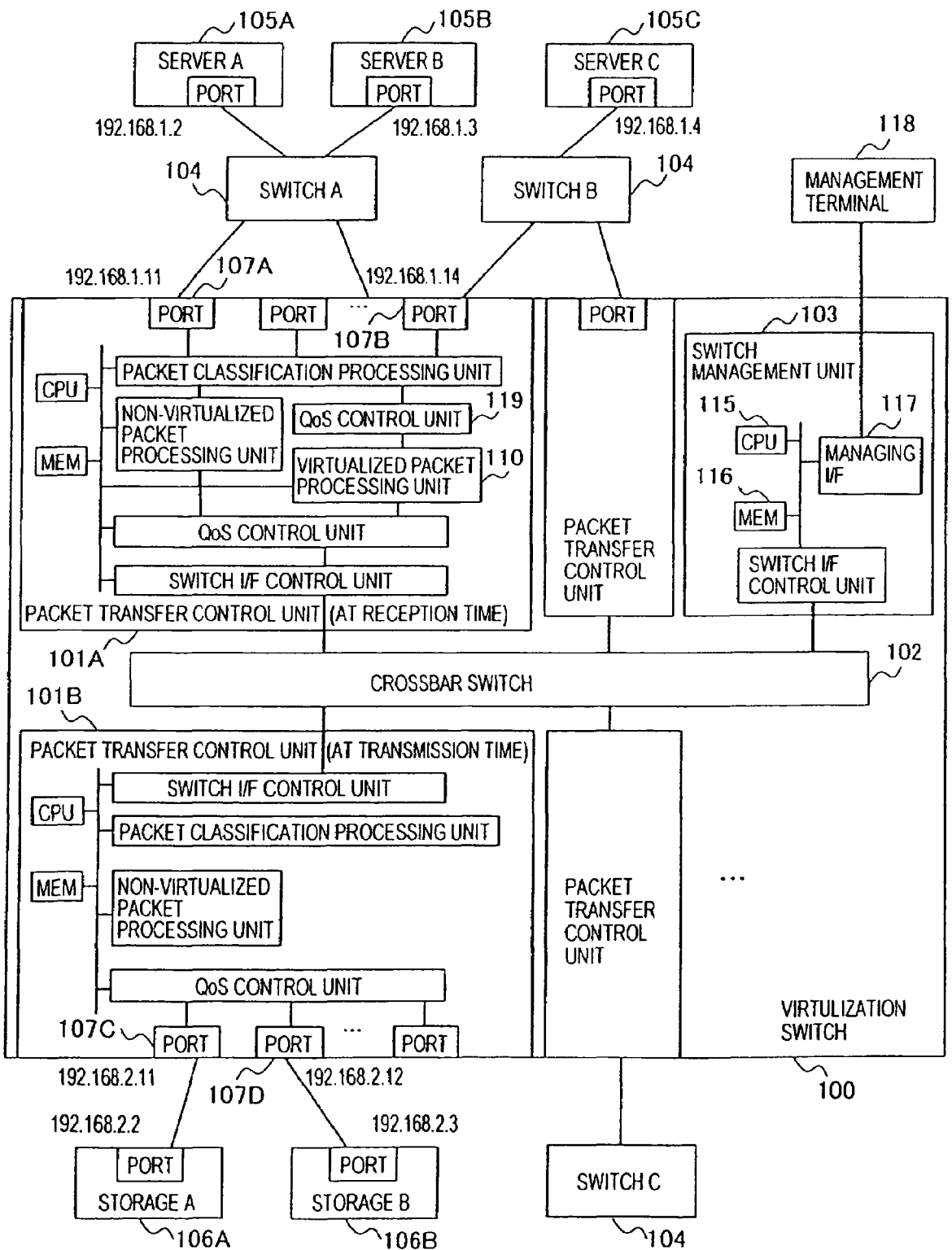
FIG. 1 is a configuration diagram of the entirety of a system and a virtualization switch of a first embodiment.

FIG. 1 is a diagram showing a configuration of a system entirety of this embodiment. The system of the embodiment is provided with a virtualization switch 100, a plurality of switches 104, a server A (105A), a server B (105B), a server C (105C), a storage A (106A), a storage B (106B) and a management terminal 118. In case no specification is necessary, the server A (105A), the server B (105B) and the server C (105C) will be represented by a server device 105, and the storage A (106A) and the storage B (106B) will be represented by a storage system 106. Here, the switches 104 can be dispensed with.

The server device 105 and the storage system 106 are individually connected with the virtualization switch 100 and the plural switches 104 through their ports.

The virtualization switch 100 is provided with a plurality of packet transfer control units 101, 101A and 101B, a crossbar switch 102 and a switch management unit 103. Moreover: the packet transfer control unit 101 is provided with a port 107; the packet transfer control unit 101A is provided with ports 107, 107A and 107B; and the packet transfer control unit 101B is provided with ports 107, 107C and 107D. These packet transfer control units will be represented by the packet transfer control unit 101, and the ports will be represented by the port 107, in case their specific discriminations are unnecessary. Here, the port 107 may be independently disposed outside of the packet transfer control unit 101.

The crossbar switch 102 connects the plural packet transfer control units 101 and the switch management unit 103.

On the basis of the information on the header or information storage unit more significant than the data link layer of a packet to be transmitted/received, the packet transfer control unit 101 determines of the destination port 107, and discriminates the contents of the packet and converts the packet, if necessary. The ports are represented by the port 107.

The port 107 connects the switch 104, the server device 105, the storage system 106 and so on.

Here, the conversion of packets in this embodiment is to convert in the virtualization switch 100 the packets transmitted from the server device 105 to the virtualization switch 100, into the packets from the virtualization switch 100 to the storage system 106. In this specification, this conversion will be called the "packet conversion from virtual to real", and the processing of this conversion will be called the "virtualization conversion processing".

The packet transfer control unit 101 is provided with a packet classification control unit 108 which determines the kind of a packet to be transmitted/received, on the basis of the information of the header of the data link layer or a higher layer or of the information storage unit, a non-virtualized packet processing unit 109 which processes the non-virtualized packet in case the virtualized conversion processing is not performed, a virtualized packet processing unit 110 which processes the packet in case the virtualized conversion processing is performed, QoS control units 111 and 119 which control the quality of services by discriminating the flow of the packet to be transmitted/received, on the basis of the information of the header of the data link layer or a higher layer or of the information storage unit, a switching interface (hereinafter, abbreviated into the "switch I/F") control unit 112 which communicates with the remaining packet control units 101 and the switch management unit 103, a CPU 113 which controls the packet transfer control unit 101 as a whole, and a main memory 114 which stores a transmission/reception buffer which stores the packet, the program and the data.

The switch management unit 103 performs the device management of the virtualization switch 100 and the calculation of the routing control protocol.

The switch management unit 103 is provided with a CPU 116 which controls the switch management unit 103 as a whole, a main memory 116 which stores the programs and the data, a managing interface (hereinafter, abbreviated into the "management I/F") 117, the switch I/F control unit 112 which communicates with the packet transfer control unit 101 to be connected with the crossbar switch 102.

The managing I/F 117 is connected with the management terminal 118 (e.g., the dam terminal or the console terminal), or the ordinary personal computer (not shown) or the server device (not shown) through the serial cable, the Ethernet cable or the like.

The ports 107 of the virtualization switch 100 and the ports of the server 105 and the storage system 106 of FIG. 1 show IP addresses partially. These IP addresses will be used in the description to be made.

For easy understanding, moreover, the packet transfer control unit 101 is shown as the different packet transfer control units 101A and 101B, respectively, as for the time of reception from the server device 105 and for the time of transmission from the storage system 106.

In the packet transfer control unit 101A at the reception time and the packet transfer control unit 101B at the transmission time, the packet classification control unit 108 and the QoS control unit 111 are located at reverse positions in accordance with the processing flow in the packet transfer control unit 101.

Moreover, the virtualization in the system is performed only in the packet transfer control unit 101A on the reception side. Therefore, the virtualized packet processing unit 110 is shown only in the packet transfer control unit 101A on the reception side. Here, the virtualized packet processing unit 110 may be provided with all the packet transfer control units 101 or only by the packet transfer control unit 101 on the reception side, as shown in FIG. 1.

Figure 2:
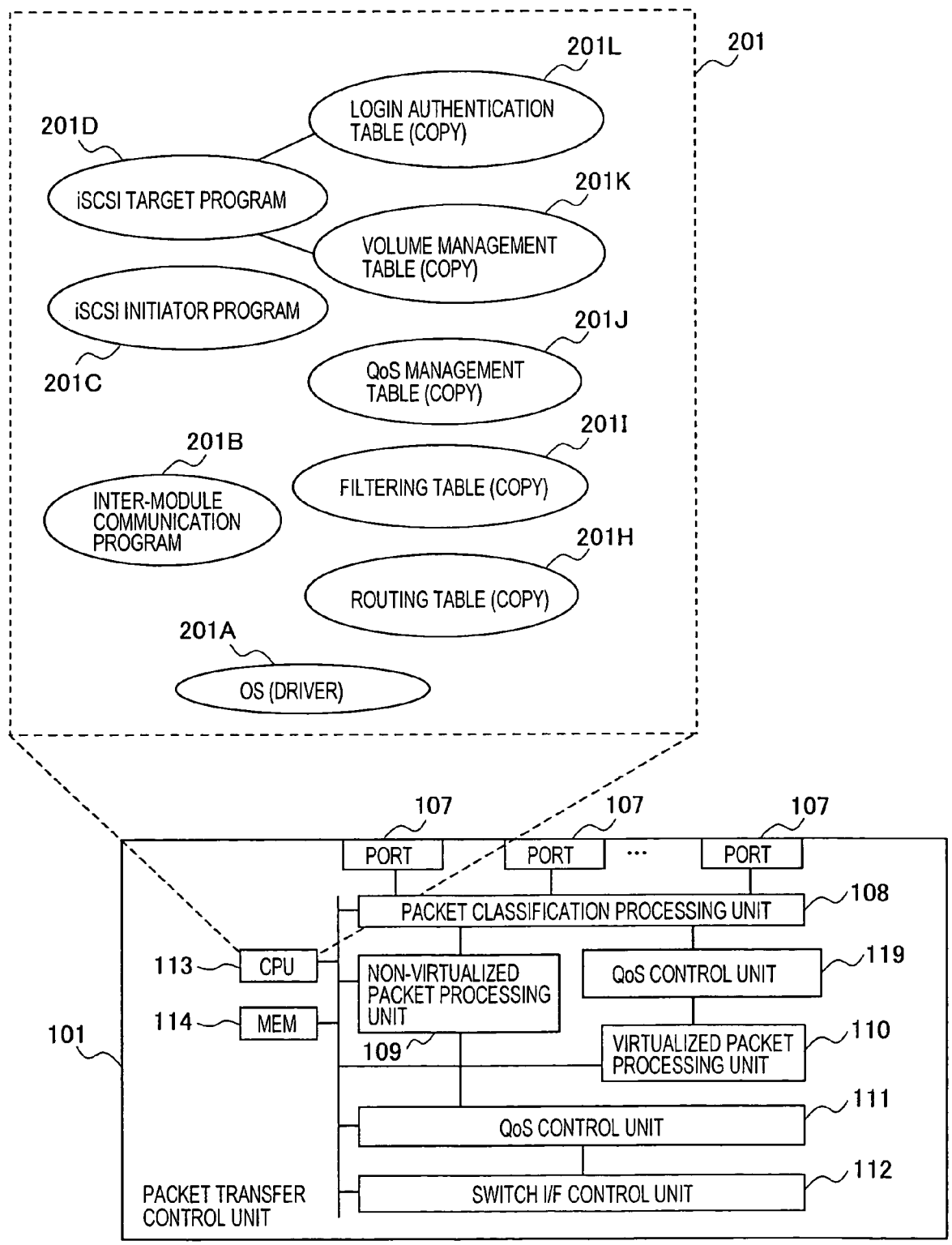
FIG. 2 is a diagram which explains a representative program and a table of a packet transfer control unit.
Figure 3:
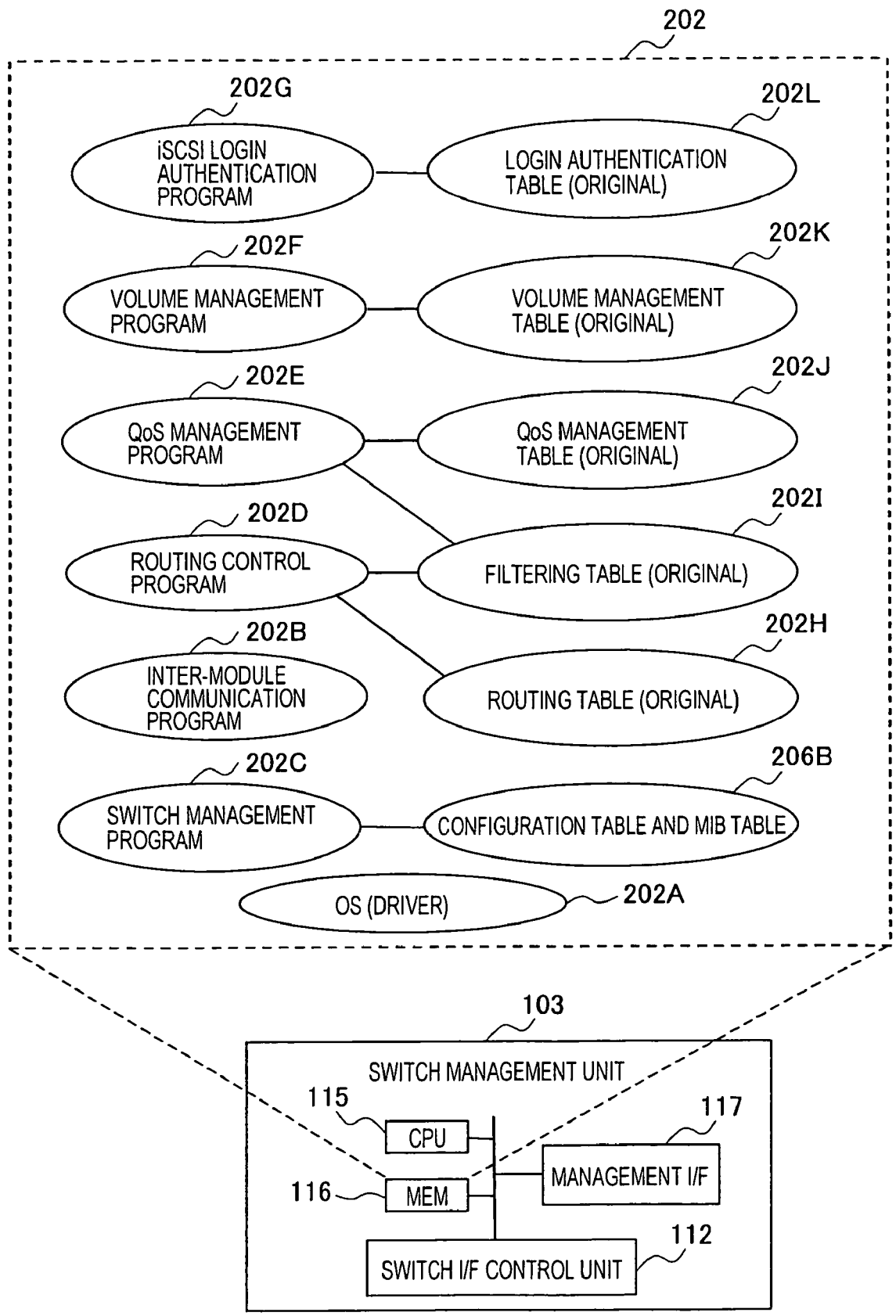
FIG. 3 is a diagram which explains a representative program and a table of a switch management unit.

FIG. 2 shows a representative program to be stored in the main memory 114 of the packet transfer control unit 101, and FIG. 3 shows a representative program to be stored in the main memory 116 of the switch management unit 103 together with the tables used when they are individually executed (such that the programs and the tables are encircled).

The main memory 114 of the packet transfer control unit 101 is provided with an operating system (hereinafter, abbreviated into "OS") 201A, an inter-module communication program 201B which communicates with the switch management unit 103 and so on, and an iSCSI target program 201D and an iSCSI initiator program 201C which perform iSCSI processing, a login authentication table 201L, a volume management table 201K, a QoS management table 201J, a filtering table 201I and a routing table 201H.

Here, the aforementioned individual tables held by the packet transfer control unit 101 are the copies which are created and held with the same names by the switch management unit 103. By holding the copies of those tables, the packet transfer control unit 101 is enabled to transfer the packets on the basis of the information of the tables held by itself.

Likewise, the main memory 116 of the switch management unit 103 is provided with an OS 202A, a switch management program 202C, a configuration table and MIB table 206B to be stored with the constitution definition of the switch management program 202C and the MIB (Management Information Base), a routing protocol program 202D such as the RIP (Routing Information Protocol) or the OSPF (Open Shortest Path First), a routing table 202H for the program, an iSCSI login authentication program 202G which performs the login authentication at the time of the login to the iSCSI target, and a login authentication table 202L for the program, a volume management program 202F which configures the virtual storage with the logical volume of the storage system 106 to be connected, a volume management table 202K, a QoS management program 202E which sets the quality of services for the virtual volume, and a QoS management table 202J, and a filtering table 202I.

The configurations of the individual tables shown in FIG. 2 and FIG. 3 will be described in the following.

In this embodiment, the virtualization switch 100 is provided, as the configuration information of the table defining the virtual volume, with a logical volume (or a real volume) in the storage system 106, an IP address of the port of the storage system 106 of the case of making access to the logical volume, and a port ID of the virtualization switch designating the access route of the storage system 106 from the virtualization switch 100 and a source port number of the TCP (Transmission Control Protocol) connection of the case of configuring the virtual volume.

Further the virtualization switch 100 is provided with the IP address of the server device 105 using the virtual volume, the port ID of the virtualization switch designating the access route from the server device 105 to the virtualization switch 100, the I/O number, bit number and byte number. The I/O number, bit number and byte number per unit time limit priority, the bandwidth information for the bandwidth control, and the amount of access information, which decides the QoS at the time of using the virtual volume for the server device 105.

On the basis of the configuration defining those virtual volumes, the virtualization switch 100 performs the priority control and the bandwidth control not only at the ports on the side of the server device 105 but also at the ports on the side of the storage device.

The individual tables for holding these information will be described in the following. FIG. 4 to FIG. 8 present examples of the configurations of the individual tables shown in FIG. 2 and FIG. 3.

FIG. 4 is a diagram showing an example of the configuration of a routing table 400 (201H and 202H). This routing table 400 executes the routing protocol program 202D to hold the routing information collected. The routing protocol program 202D communicates with the routing protocol programs of the other switches 104 and the routers to create the routing table 400. In accordance with the information of the routing table 400, the packet transfer control unit 101 transfers the packet received.

The routing table 400 has an entry 404 having a set of an IP address 401, a next hop address 402 and a destination port address 403. The entries 404A, 404B, 404C, 404D, 404E, 404F and 404G will be described as the examples of the entry 404.

The entry 404A is an example of the configuration for indicating the route of default.

The entries 404B to 404G contain a slash "/" in the IP address 401. The numerals after the slash indicate the length (orbits) of the sub-netmask. For example, the entry 404B is "192.168.1.0/24", which indicates that the sub-net mask has a length of 24 bits, and that the string "192.168.1" is the network address.

The entry 404D indicates the address of the port 107A, and the entries 404E to 404G indicate the IP address 601B of the virtual volume, described later. Here, the entries 404D to 404G indicate that the subnet mask of the IP address 401 has 32 bits and is a host address. A loop back address "127.0.0.1" is stored as the next hop address 402. It is, therefore, indicated that the IP address exists in the virtualization switch 100.

FIG. 5 is a diagram showing a configuration example of a QoS management table 500 (201J and 202J). This QoS management table 500 stores information for managing the QoS demanded by the individual server devices 105.

This QoS management table 500 is configured of an entry 506 having a set of a server IP address 501, a server side port IP address 502, a QoS 503, a virtual volume ID 504 and a filtering processing 505.

In this embodiment, the QoS are specified by the degrees of priority (i.e., two stages of priority and nonpriority) between the virtual volumes given the common server side port IP address 402, and either the bandwidth permitted at the access time or the I/O (Input/Output) number per unit time. Therefore, the QoS 503 is further provided with a priority 503A and a limit 503B. In this embodiment, the priority 503A will be described for simplicity on the case, in which the values are the priority and the nonpriority. In another example, the priority can also be indicated by numerals. The limit 503B will be described for simplicity on the case, in which the quantity of data transfer per unit time is indicated by megabytes/second (MB/s). In other examples, the indication can be made by bit numbers.

The virtual volume ID 504 stores the ID of the virtual volume assigned to each server device 105. The virtual volume ID is one given to each virtual volume and is managed by a later-described volume management table 600. The ID to be stored in the virtual volume ID 504 corresponds to the ID 601A of the volume management table 600. In this embodiment, for example, the V1 stored in the virtual volume ID 504 of an entry 506A indicates entries 606A and 606B, in which it is stored in the ID 601A, in the volume management table 600.

The filtering processing 505 is further provided with the reception time 505A and transmission time 505B. The reception time 505A and transmission time 505B stores, respectively, processing IDs 703 and 803 indicated by later-described filtering tables 700 and 800. These settings will be described hereinafter.

Here, the information held by the individual items of the server IP address 501, the server side port IP address 502, the QoS 503 and the virtual volume ID 504, are set with the management terminal 118 by the manager through the interface provided by the QoS management program 202E.

FIG. 6 is a diagram showing a configuration example of the volume management table 600 (201K and 202K). This volume management table 600 stores the information which causes the virtual volume provided to the server device 105 by the virtualization switch 100 to correspond to the real volume provided by the storage system 106.

The volume management table 600 is configured of an entry 606 having a set of a virtual volume 601, a storage side port IP address 602, a storage IP address 603, a real volume logic unit number (hereinafter, abbreviated into the "LUN") 604 and a source TCP port 605.

The virtual volume 601 specifies the virtual volume and stores the information necessary to access from the server device 105 to the virtual volume. The virtual volume 601 is provided with the ID 601A or an identifier given to each virtual volume, the IP address 601B assigned to the virtual volume, a TCP port 601C, an iSCSI name 601D and a logical unit number LUN 601E defined for the virtual volume. In this embodiment, the value of the iSCSI name 601D is indicated by the IQN (iSCSI Qualified Name), for example. Moreover, the individual values of the entries 606A to 606E are indicated to correspond to the IP addresses of the ports of the virtualization switch 100 and the servers 105 shown in FIG. 1.

According to this embodiment, for example, the virtual volumes specified by the ID 601A are provided by the logical units of the real volumes specified by the LUN 604.

Specifically, the access of the virtual volume ID (601A) to the data storage area having V1 means the server device 105 uses the VLU1 of the logical unit 601E of the virtual volume. As a matter of fact, moreover, the logical unit 604 of the storage device 106 having the storage IP address 603 of "192.168.2.2" uses LU1 or LU2.

Here, the above-specified individual items are set by the manager from the management terminal 118 through the interface provided by the volume management program 202F.

Here will be described the filtering tables (201I and 202I) which are created according to the QoS management program 202E by the QoS management table 500 and the volume management table 600. The detail of the filtering table creation will be described hereinafter.

The filtering table (201I or 202I) is provided with the reception time filtering table 700 (201I or 202I) used by the packet transfer control unit (at the reception time) 101A, and the transmission time filtering table 800 (201I or 202I) used by the packet transfer control unit (at the transmission time) 101B. The reception time filtering table 700 and the transmission time filtering table 800 will be called together as the filtering tables 700 and 800, in case they need not be discriminated.

FIG. 7 and FIG. 8 are diagrams showing the configuration diagrams of the reception time filtering table 700 and the transmission time filtering table 800, respectively.

The filtering tables 700 and 800 store the conditions for the information stored in the header portion of the packet to satisfy, and the processing to be performed by the packet transfer control unit 101 in case the information matches the condition. The filtering tables 700 and 800 are configured of matching conditions 701 and 801, processings 702 and 802, and entries 704 and 804 having a set of processing IDs 703 and 803, respectively.

The matching conditions 701 and 801 store the conditions of one or combined partial values of the headers or information portions of each layer of the iSCSI packets (TCP/IP packets). Here in this embodiment, the plural conditions to be combined are indicated by "AND".

The processings 702 and 802 store the operations which are performed by the packet transfer control unit 101 in case all the plural conditions combined with the matching conditions 701 and 801 by the "AND" are identical. The operations to be stored relate to the controls of the QoS of the received packets and are specified by "Transfer to Prior Queue", "Transfer to Non-Prior Queue", "Limit Performance to 1 MB/s" or the like. In case a packet acquires a filtering result to perform the operation "Transfer to Priority Queue", therefore, the packet transfer control unit 101 transfers that packet to the priority queue provided with the switch.

The plural operations can also be done by the processings 702 and 802. This case means that all the operations combined by the "AND" are performed.

At an entry 704A of FIG. 7, for example, in case the information of the header portion of the received packet is identical to the matching condition 701, the priority is set to "prior", and the "Transfer to Priority Queue" is stored in the processing 702 so that the package may be processed. At an entry 704B, on the other hand, in case the information is identical to the matching condition 701, the priority is the "nonpriority", and the quantity of data transfer permitted at the access time is limited to 1 MB/s. Therefore, the operations of the "Transfer to Nonpriority Queue" AND "Limit Performance to 1 MB/s" are stored in the processing 702.

The processing IDs 703 and 803 store the IDs given to the individual entries. These IDs are stored in the filtering processing 505 of the QoS management table 500 so that the individual filtering processings are specified.

The processings of the packets in the virtualization switch 100 will be described with reference to FIG. 9 to FIG. 15. The additional description will be made on the processing flows of the programs shown in FIGS. 2 and 3 and the methods of creating and utilizing the individual tables shown in FIG. 4 to FIG. 8.

The first description is made on the processing which is done at the packet transfer control unit (at the reception time) 101A of FIG. 1 when the virtualization switch 100 receives the packets. The packet transfer control unit (at the reception time) 101A having received the packets classifies the received packets according to their kinds in the packet classification control unit 108. The packets classified are processed at the virtual packet processing unit 110 and the QoS control unit 111 through non-virtualized packet processing unit 109 and the QoS control unit 119 and are then transmitted to the crossbar switch 102 through the switch I/F 112.

Figure 9:
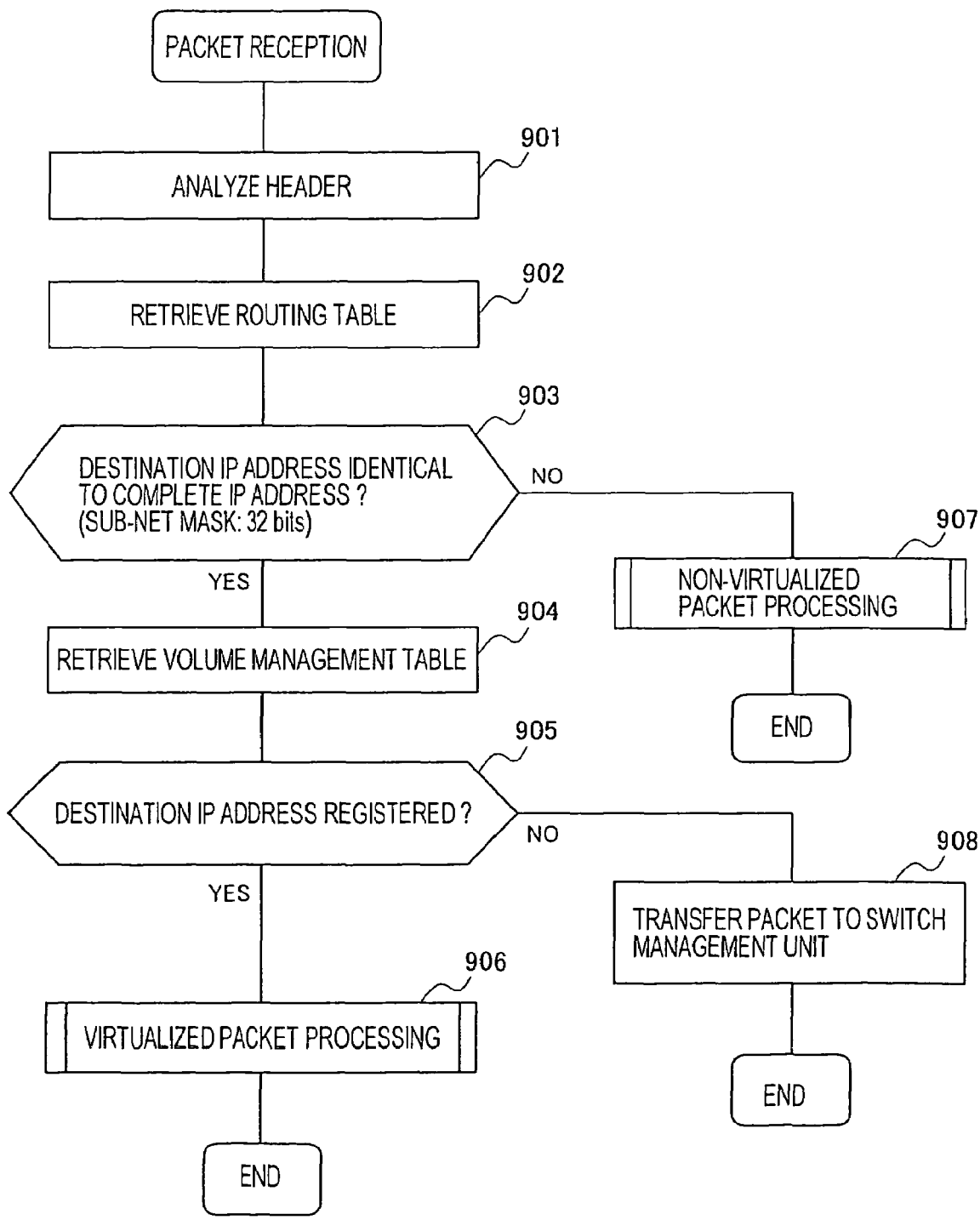
FIG. 9 is a processing flow of a packet classification processing unit at the reception time.

FIG. 9 is a processing flow of the packet classification processing unit 108 of the packet transfer control unit (at the reception time) 101A of FIG. 1.

When the packet classification control unit 108 receives packets from the port 107, it analyzes the header information of the packets (at Step 901) and retrieves the routing table 400 (at Step 902).

The packet classification control unit 108 discriminates whether or not the received packets are addressed to the virtualization switch 100 of itself. Specifically, the packet classification control unit 108 collates the destination IP address of the received packets with the IP address 401 of the routing table 400, and discriminates (at Step 903) whether or not the destination IP address is identical to the complete IP address, i.e., the IP address having the subnet mask of 32 bits.

If this answer is YES, the packet classification control unit 108 discriminates whether or not the packet is addressed to the virtual volume. Specifically, the packet classification control unit 108 retrieves the volume management table 600 (at Step 904). If the IP address 601B is registered with the destination IP address of the packet (at Step 905), it is discriminated that the received packet has been transmitted to the virtual volume, and the processing is inherited for the virtualized packet processing (at Step 906) to the virtualized packet processing unit 110 through the QoS control unit 119.

In case the answer of Step 905 is NO (at Step 905), the packet classification control unit 108 transfers the received packet to the switch management unit 103 (at Step 908) through the switch I/F control unit 112. In this case, the received packet is one to be used for controlling and managing the virtualization switch 100.

In case it is decided (at Step 903) that the IP address is not identical to one having the subnet mask of 32 bits, on the contrary, the packet classification control unit 108 causes the non-virtualized packet processing unit 109 to inherit the processing and to perform the non-virtualized packet processing (at Step 907).

Figure 10:
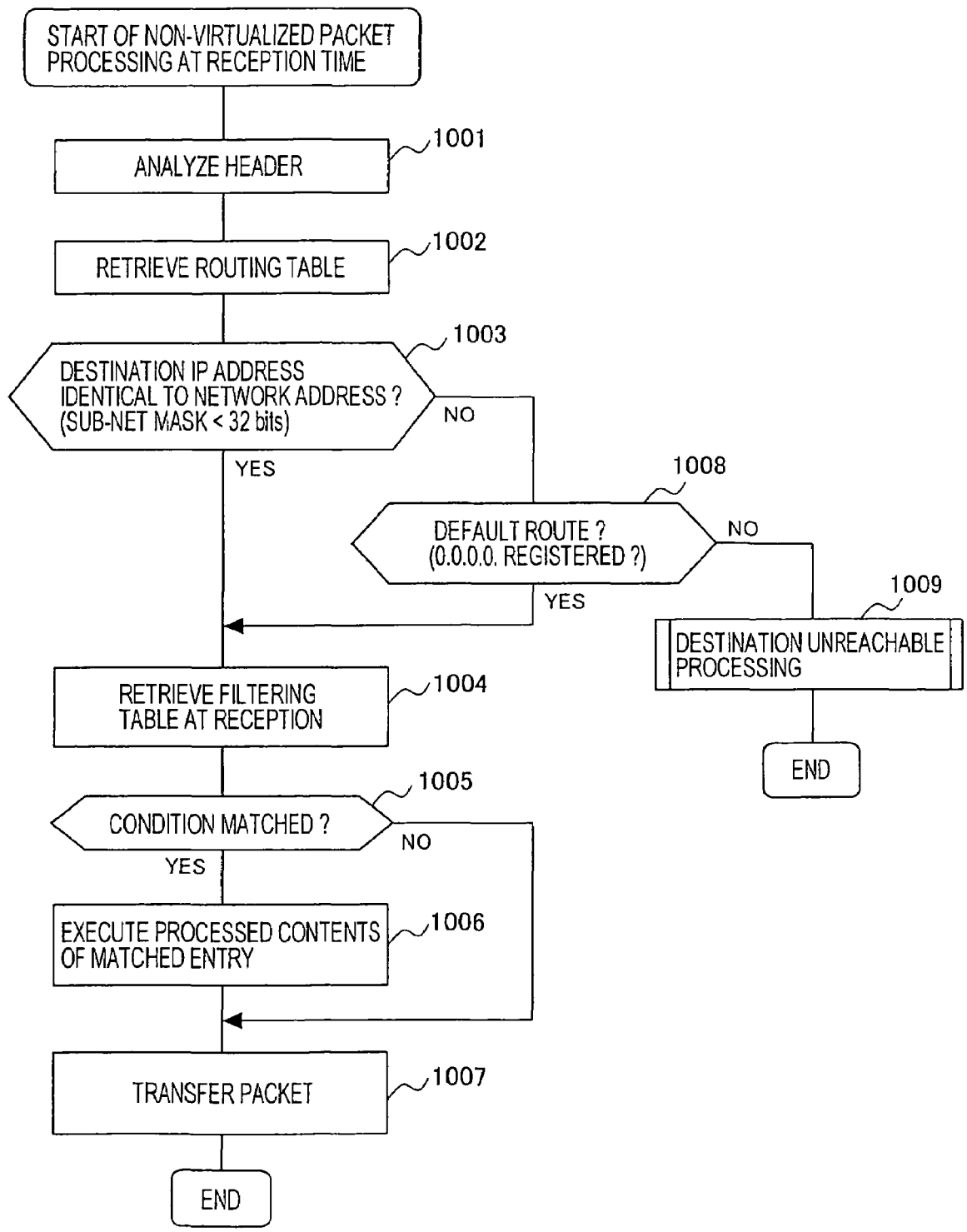
FIG. 10 is a processing flow of a non-virtualized packet processing unit and a QoS control unit at the reception time.

Here will be described the detail of Step 907 of FIG. 9, that is, the detail of the processing of the non-virtualized packet processing unit 109 of the packet transfer control unit (at the reception time) 101A of FIG. 1 and the subsequent processing of the QoS control unit 111. These are the general routing processings of the switch in the network layer (i.e., the IP layer). FIG. 10 shows a flow of those processings.

The packets to be transferred to the non-virtualized packet processing unit 109 are not addressed to the virtual volume.

When the non-virtualized packet processing unit 109 receives packets from the packet classification control unit 108, it analyzes the header information of the packets (at Step 1001) and retrieves the routing table 400 (at Step 1002).

The non-virtualized packet processing unit 109 collates the destination IP address of the packet analyzed at Step 1001 with the IP address 401 of the routing table 400, and discriminates (at Step 1003) whether or not the destination IP address is identical to the IP address having a subnet mask less than 32 bits.

In case the answer is YES (at Step 1003), the non-virtualized packet processing unit 109 transfers the packet together with the analyzed result of Step 1001 to the QoS control unit 111.

The QoS control unit 111 retrieves (the reception time filtering table 700 (at Step 1004). Here, the analyzed result at Step 1001 is collated with the matching condition 701. In case the condition is matched (at Step 1005), the contents of the processing 702 of the matched entry are executed (at Step 1006).

Then, the QoS control unit 111 transfers the packet (at Step 1007) from the switch I/F control unit 112 to the packet transfer control unit (at the transmission side) 101B having the port of the destination port address 403 through the crossbar switch 102 so that the packet may be transmitted to the next hop address 402 of the corresponding entry of the routing table 400.

In case there is nothing matched at Step 1005, the QoS control unit 111 skips the processing of Step 1006 to the processing of Step 1007 while judging that the packet requires no guarantee for the QoS.

In case no identical IP address is at Step 1003, the non-virtualized packet processing unit 109 discriminates (at Step 1008) whether or not the IP address 401 is registered with a default route (having the IP address of 0.0.0.0). In case this answer is YES, the non-virtualized packet processing unit 109 transfers the packet to the QoS control unit 111 at Step 1008. The QoS control unit 111 having received the packet performs the processings at and after the processing Step 1004.

In case there is no registration of the default route at Step 1008, the packet cannot reach the destination IP address. Therefore, the non-virtualized packet processing unit 109 performs a destination unreachable processing (at Step 1009). This processing is a non-virtualized one for the switch or the router so that its description is omitted here.

Here will be described the detail of the virtualized packet processing to be performed at Step 906 of FIG. 9, that is, the processings of the QoS control unit 119 and the virtualized packet processing unit 110 and the processing of the subsequent QoS control unit 111 of the packet transfer control unit (at the reception time) 101A of FIG. 1.

FIG. 1 shows a processing flow of that routine.

Here are performed the processings to end and start the TCP connection together with the conversion of the packet. Specifically, the received packet is subjected to a targeting processing thereby to end the TCP connection between the server 105 and the virtualization switch 100. After the packet was converted, an initiator processing is performed again to start the TCP connection between the virtualization switch 100 and the storage system 106.

When the QoS control unit 119 receives a packet from the packet classification control unit 108, it performs the filtering processing at the reception time (at Step 1101), and transfers the processed packet to the virtualized packet processing unit 110. The filtering processings at the reception time are similar to those of Step 1004 to Step 1006, shown in FIG. 10.

After this, the virtualized packet processing unit 110 performs a program processing of an iSCSI target (at Step 1101). This processing is a general one for the iSCSI so that it will not be described. This processing includes the login process, the read and write of the SCSI command, and so on.

The virtualized packet processing unit 110 analyzes the processed result (at Step 1102). In case it is judged (at Step 1103) as a result of the analysis that the received packet makes access to the virtual volume, the volume management table 600 is retrieved (at Step 1104), and the accessed storage system 106 is determined (at Step 1105). Here, the routine is ended in case it is judged at Step 1103 as a result of the analysis of Step 1102 that the access is not to the virtual volume.

The virtualized packet processing unit 110 performs the iSCSI initiator program processing (at Step 1106) on the storage system 106 to be accessed to. This processing is a general one of the iSCSI so that it will not be described. This processing includes the login process, the read and write of the SCSI command, and so on.

The virtualized packet processing unit 110 analyzes the processed result (at Step 1107), and judges whether or not the processing instructed by the received packet is to start the iSCSI session. In case the iSCSI session is started (at Step 1108), the source TCP port 605 of the volume management table 600 is registered (at Step 1109) with the source TCP port number of the TCP connection to be used by the iSCSI session, and the routine is ended.

In case the iSCSI session has already been started (at Step 1108) as a result of the analysis of Step 1107, it is judged (at Step 1110) whether or not the access is one to the real volume such as the read, write and inquiry of the SCSI command. In case it is judged that the access is not made to the real volume, this routine is ended.

In case it is decided at Step 1110 that the access is made to the real volume, the virtualized packet processing unit 110 converts the packet from virtual to real (at Step 1111) in accordance with the information of the volume management table 600, and transfers the converted packet to the QoS control unit 111.

The QoS control unit 111 transfers the packet (at Step 1112) from the switch I/F control unit 112 to the packet transfer control unit (at the transmission side) 101B having the port of the destination port address 403 through the crossbar switch 102 so that the packet may be transmitted to the next hop address 402 of the corresponding entry of the routing table 400.

Here, the packet conversion from virtual to real is to convert the packet sent from the server device 105 to the virtualization switch 100, by using the volume management table 600, into the packet addressed from the virtualization switch 100 to the storage system 106. In short, the destination of the packet is converted from the virtual volume, into the real volume of the storage system 106 corresponding to that virtual volume. This conversion will be specifically hereinafter.

Here, the processings of the foregoing Steps 1102 and 1103 and the processing of Step 1110 are emergent error recoveries and additional ones so that they can be dispensed with.

Here will be described the processing to be performed at the packet transfer control unit (at the transmission time) 101B after the aforementioned packet transfer control unit (at the reception time) 101A. Without the virtualized conversion processing, therefore, the packet is transferred, when received through the switch I/F control unit 112, to the non-virtualized packet processing unit 109 without any process at the packet classification control unit 108.

Figure 12:
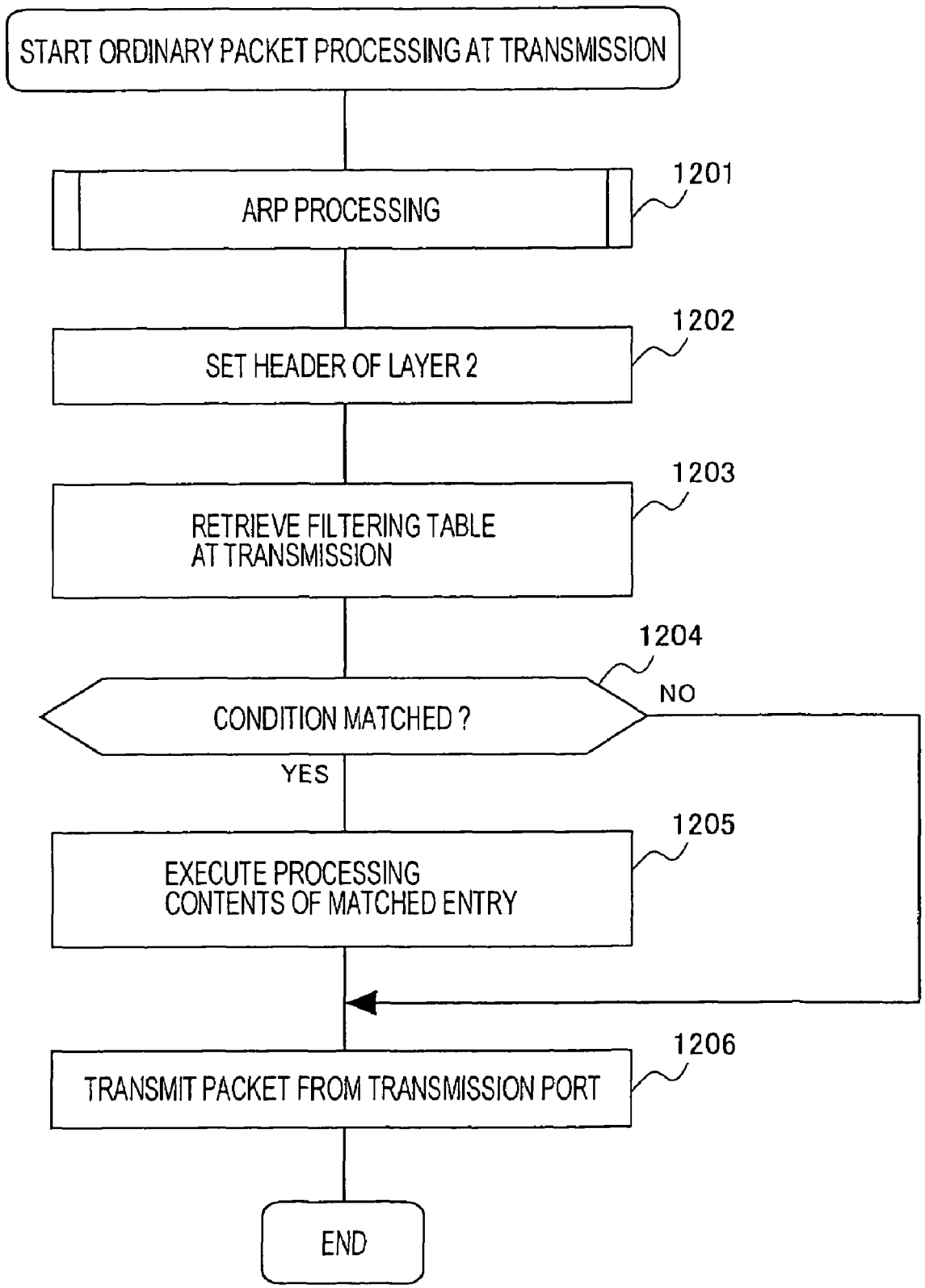
FIG. 12 is a processing flow of a non-virtualized packet processing unit and the QoS control unit at the transmission time.

Here will be described the processing of the non-virtualized packet processing unit 109 of the packet transfer control unit (at the transmission time) 101B of FIG. 1 and the subsequent processing of the QoS control unit 111. The flow of these processings is shown in FIG. 12.

The non-virtualized packet processing unit 109 performs the ARP (Address Resolution Protocol) processing (at Step 1201), when it receives a packet from the packet classification control unit 108, to acquire the MAC address information of the destination IP address of the packet thereby to set the header (i.e., the destination MAC address and the source MAC address) of the layer 2 (i.e., the data link layer) of the packet (at Step 1202).

The packet is transferred together with the information acquired and set at Step 1202, to the QoS control unit 111.

The QoS control unit 111 retrieves the transmission time filtering table 800 (at Step 1203), and discriminates (at Step 1204) whether or not the received packet matches the matching condition 801. In short, it is judged whether or not the received packet demands the guarantee of a predetermined QoS.

In case the condition is matched at Step 1204, that is, in case the guarantee for the QoS is demanded, the QoS control unit 111 executes the processing contents of the corresponding entry (at Step 1205), and transmits the packet from the transmission port (at Step 1206).

In case the condition is not matched at Step 1204, that is, in case the packet does not demand the guarantee for the QoS, the received packet is sent from the transmission port (at Step 1206) without any filtering processing.

Here will be described an iSCSI packet 1301 to be transmitted/received in this embodiment. Here will also be described a specific example of the aforementioned packet conversion from virtual to real by using the iSCSI packet 1301.

Figure 13:
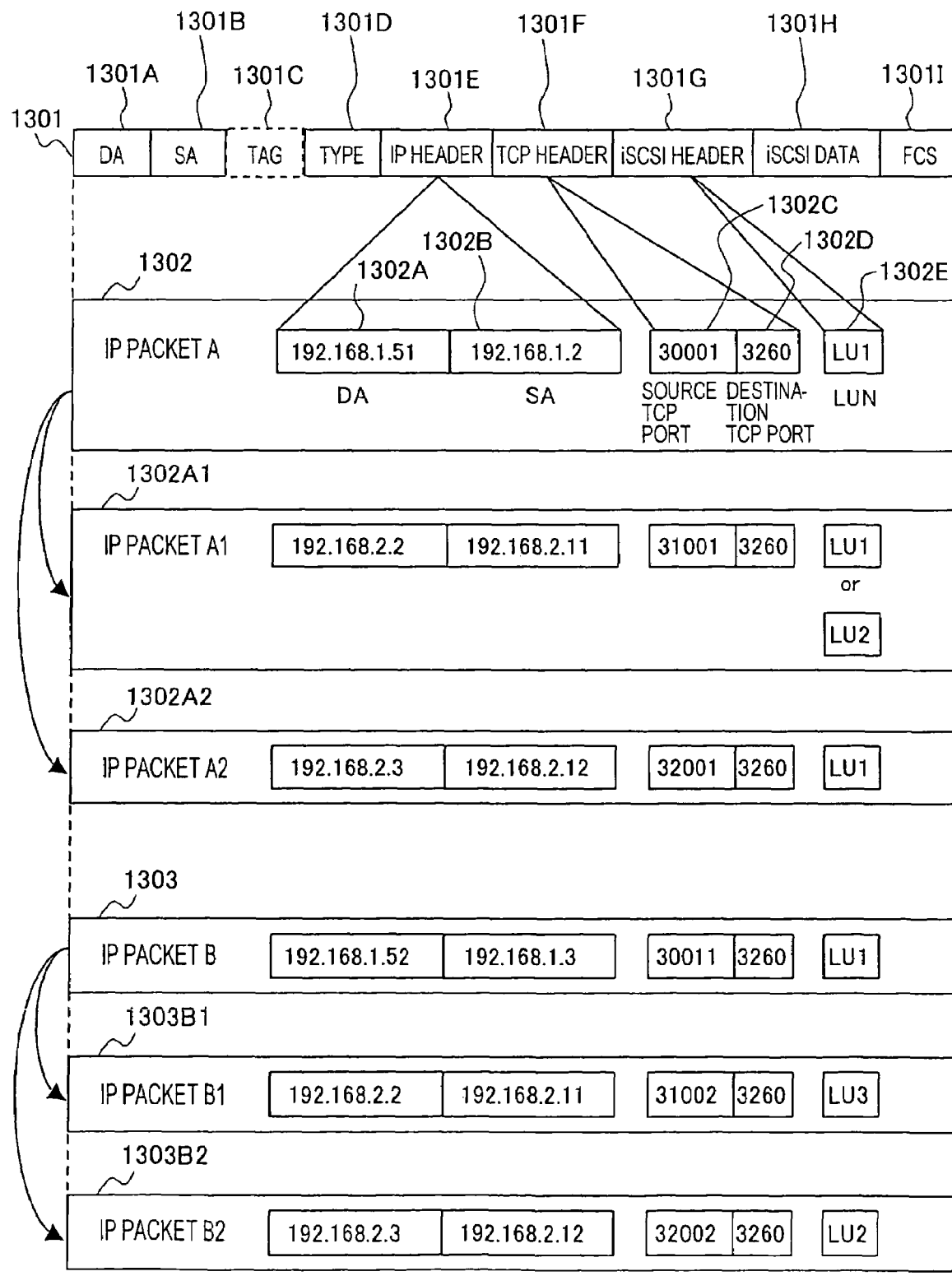
FIG. 13 is a diagram showing a configuration example of an iSCSI packet.

A configuration example of the iSCSI packet is shown in FIG. 13.

The iSCSI packet 1301 is provided with a MAC header having a destination MAC address (DA: Destination Address) 1301A, a source MAC address (SA: Source Address) 1301B, a VLAN (Virtual LAN) tag 1301C and a type 1301D, an IP header 1301E, a TCP header 1301F, an iSCSI header 1301G, an iSCSI data 1301H, and an FCS (Frame Check Sequence) 1301I.

An IP packet A (1302) exemplifies a packet of the case, in which the virtual volume ID 601 makes an access from the server A (105A) of FIG. 1 to the virtual volume of V1. The virtualization switch 100 converts the IP packet A (1302) into the IP packet A1 (1302A1) and an IP packet A2 (1302A2) or the packets to make an access to the real volume.

The packet classification control unit 108 analyzes the header and discriminates (at Step 902 of FIG. 9) whether or not the IP address 401 of the routing table 400 is identical to the destination address (DA) 1302A "1192.168.1.51" of the IP header 1301E. Here, the identity to the IP address 401 of the entry 404F holds, the routine advances to Step 904 of FIG. 9.

The volume management table 600 is retrieved, and it is discriminated (at Step 905 of FIG. 9) whether or not the entry having the IP address 601B identical to the IP address of DA 1302A is registered. Here, the two entries 606A and 606B are identical.

Therefore, the routine advances to Step 906 of FIG. 9, at which virtualized packet processing is performed. The routine advances to Step 1111 of FIG. 11. Here are created the IP packet A1 (1302A1) based on the information of the entry 606A and the IP packet A2 (1302A2) based on the information of the entry 606B.

Specifically, the SA of the IP header 1301E stores the "192.168.2.11" of the storage side port IP address 602 of the entry 6060A. The DA of the IP header 1301E stores the "192.168.2.2" of the storage IP address 603. The iSCSI header 1301G stores the "LU1 or LU2" of the LUN 604. Thus, the IP packet A1 (1302A1) is created. At this time, no change is made in the TCP header 1301F.

Moreover, the SA of the IP header 1301E stores the "192.168.2.12" of the storage side port IP address 602 of the entry 606B. The DA of the IP header 1301E stores the "192.168.2.3" of the storage IP address 603. The iSCSI header 1301G stores the "LU1" of the LUN 604. Thus, the IP packet A2 (1302A2) is created. At this time, too, no change is made in the TCP header 1301F.

An IP packet B (1303) exemplifies the packet of the case, in which the virtual volume ID 601 makes an access from the server B (105B) of FIG. 1 to the virtual volume of the V2. The packet conversions from virtual to real (from the IP packet B (1303) to the IP packet B1 (1303B1) and the IP packet B2 (1303B2)) are similar to the processings to create the IP packet A1 (1302A1) and the IP packet A2 (1302A2) from the IP packet A (1302).

Here will be described the processing for creating the reception time filtering table 700. The entry is added to the reception time filtering table 700 in case the server device 105 registered in the QoS management table 500 demands the quality of services and in case the demand is not registered in the reception time filtering table 700.

Figure 14:
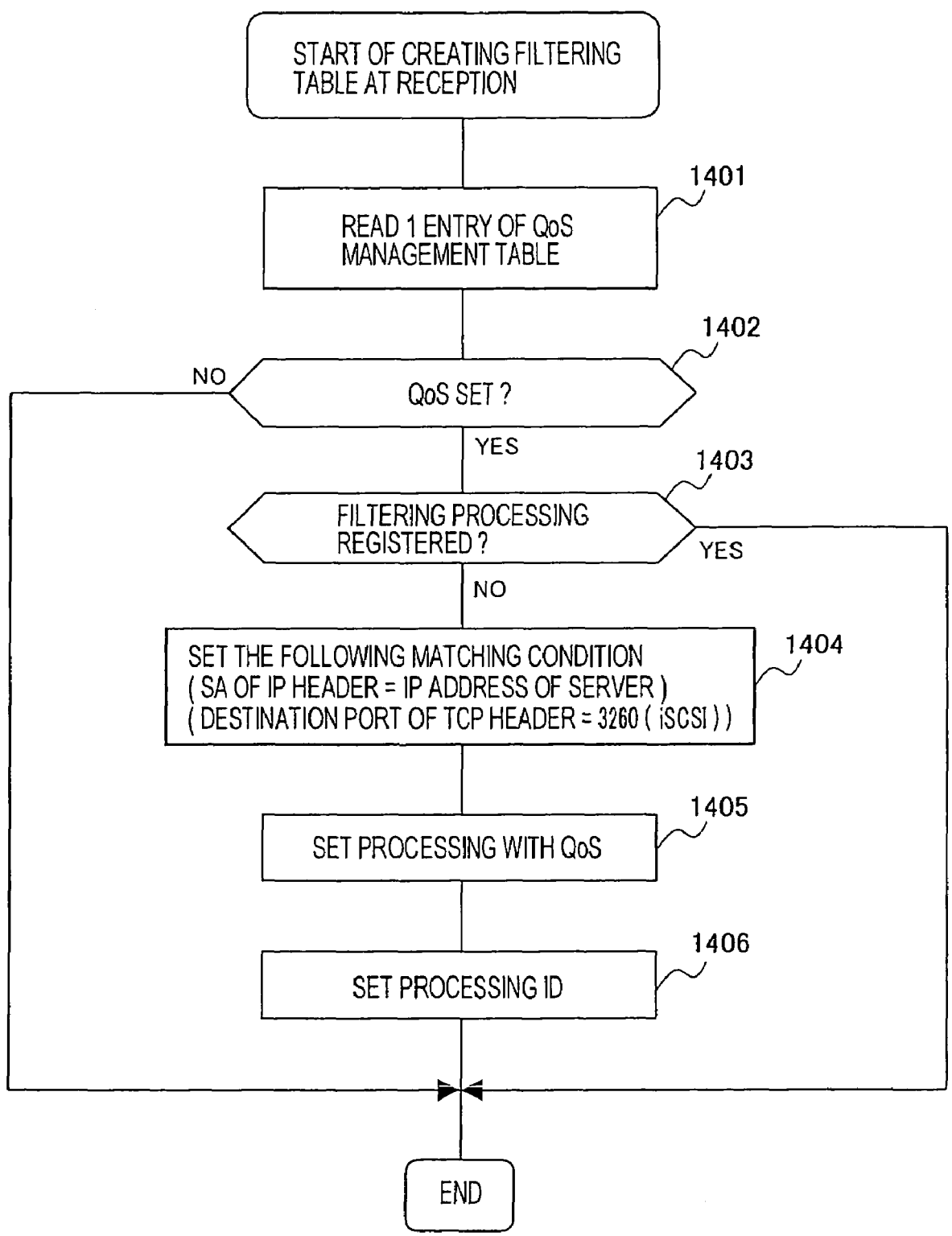
FIG. 14 is a processing flow which creates the filtering table at the reception time.

This processing flow is shown in FIG. 14. The following processing is realized such that the CPU 115 executes the QoS management program 202E.

The CPU 115 reads 1 entry of the QoS management table 500 (at Step 1401) and discriminates (at Step 1402) whether or not the QoS 503 has been set.

In case the QoS 503 is set, the CPU 115 examines (at Step 1403) whether or not the filtering processing 505A of the corresponding entry has been registered.

In the case of no registration of the filtering processing 505A, the CPU 115 creases the matching condition 701 by using the IP address of the server device 105 and the TCP port of the virtual volume. Here, the matching condition 701 of the reception time filtering table 700 is set with the "(SA of IP Header=IP Address of Server) AND (Destination Port of TCP Header=3260)" (at Step 1404).

Then, the CPU 115 sets the processing 702 with the QoS 503 of the QoS management table 500 (at Step 1405), and sets the processing ID 703 (at Step 1406). At this time, the filtering processing 505A at the processing time of the entry being processed of the QoS management table 500 is set with the aforementioned processing ID 703.

The CPU 115 ends the routine in case the corresponding entry of the QoS management table 500 is not set with the QoS 503 (at Step 1402) but registered with the filtering processing 505A (at Step 1403).

The foregoing processings are repeated by the number of entries registered in the QoS management table 500.

Here will be described the processing for creating the transmission time filtering table 800.

Figure 15:
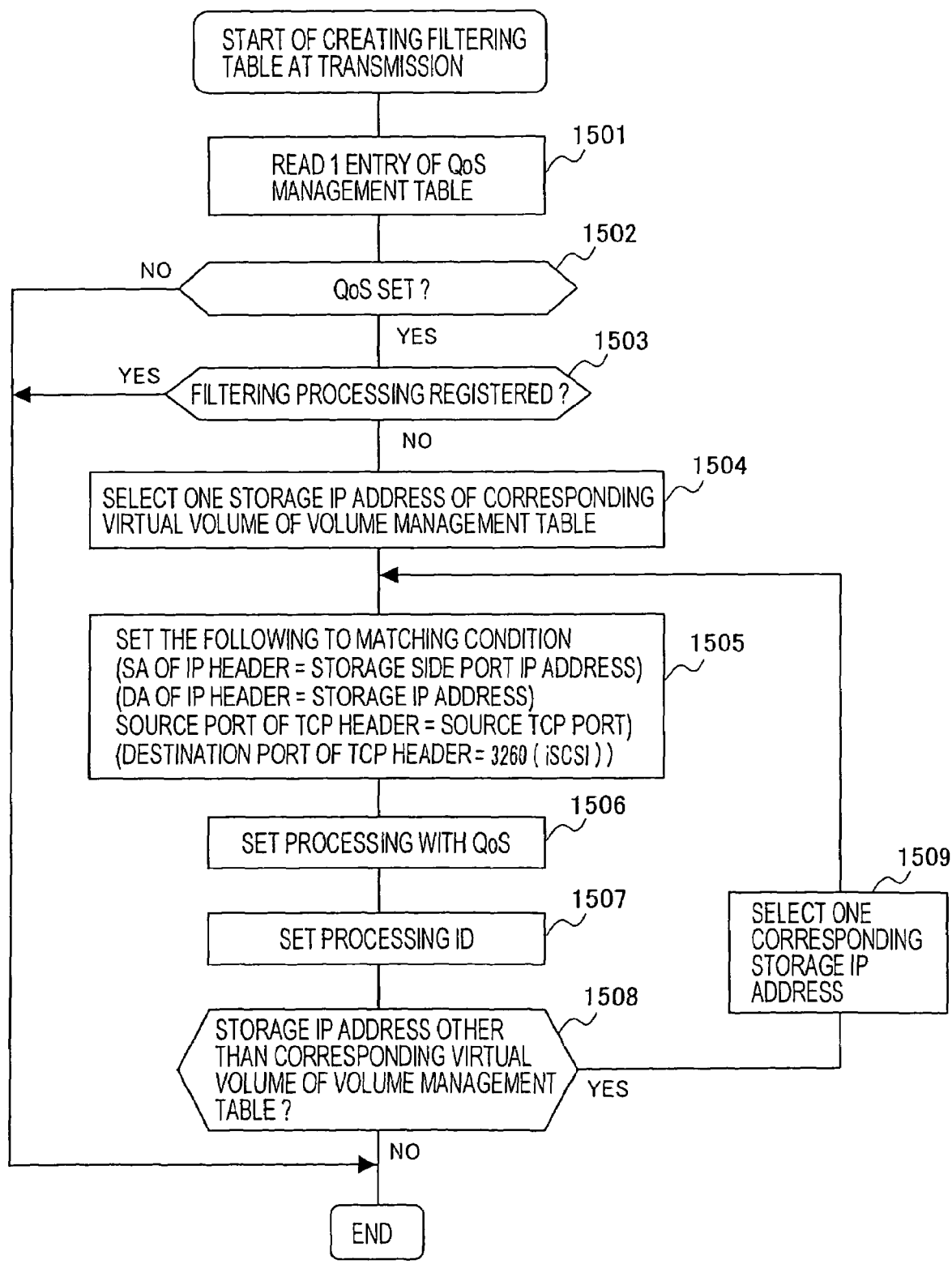
FIG. 15 is a processing flow which creates the filtering table at the transmission time.

This processing flow is shown in FIG. 15. The following processings are realized such that the CPU 115 executes the QoS management program 202E.

The CPU 115 reads 1 entry of the QoS management table 500 (at Step 1501), and discriminates (at Step 1502) whether or not the QoS 503 has been set.

In case the QoS 503 is set, the CPU 115 examines (at Step 1503) whether or not the filtering processing 505B of the corresponding entry has been registered.

In case the filtering processing 505B is not registered, the CPU 115 selects (at Step 1504) one storage IP address 603 of such a virtual volume of the volume management table 600 as corresponds to the virtual volume ID 504 of that entry, and generates and registers the matching condition 801 (at Step 1505) by using the information of that entry.

All the matching conditions are satisfied by setting the SA of the IP header with the storage side port IP address 602, the DA of the IP header with the storage IP address 603, the source port of the TCP header with the source port 605, and the destination port of the TCP header with the TCP port 601C of the virtual volume.

In case the virtual volume ID is the V1 and in case the "192.168.2.2" is selected as the storage IP address 603 at Step 1504, for example, the matching condition 801 of the transmission time filtering table 800 is set with "(SA of IP Header=192.168.2.11) AND (DA of IP Header=192.168.2.2) AND (Source Port of TCP header=31001) AND (Destination Port of TCP Header=3260)".

The processing 802 is set with the QoS 503 of the QoS management table 500 (at Step 1506), and the processing ID 803 is set (at Step 1507). At this time, the processing ID 803 is set in the filtering processing 505B at the transmission time of the entry being processed of the QoS management table 500.

In case there are a plurality of storage IP addresses of the corresponding virtual volume of the volume management table 600 (at Step 1508), the storage IP address unselected at the Step 1504 is selected (at Step 1509), and the operations at or after Step 1505 are performed. These operations from Step 1505 to Step 1508 are repeated by the number of the storage IP addresses 603 registered in the corresponding virtual volume 601A.

The routine is ended in case the QoS 503 is not set (at Step 1502) in the corresponding entry of the QoS management table 500 and in case the filtering processing 505A is registered (at Step 1503).

The operations thus far described are repeated by the number of entries registered in the QoS management table 500.

According to this embodiment, as has been described hereinbefore, the QoS of the priority control and the bandwidth control can be controlled at the unit of the virtual volume.

According to this embodiment, when an access to the virtual volume provided by the virtualization switch 100 is to be made from the server device 105, the performance demanded by the server device 105 is guaranteed such that the virtualization switch 100 controls the quality of services between the virtualization switch 100 and the storage system 106.

In the communications in the prior art between the virtualization switch 100 and storage system 106, more specifically, the virtualization switch 100 acts as an initiator to make an access to the storage system 106 so that the flow of the packets cannot be discriminated at the unit of the virtual volume. In this embodiment, however, the QoS management table 500 and the transmission time filtering table 800 are prepared, as described above, to perform the filtering corresponding to the QoS demanded for that packet in accordance with the information of the IP header and the TCP header of the packet after the virtualized converting processing. Even in the virtualization of the virtualization switch 100, therefore, the flow of the packets can be discriminated at the unit of the virtual volume thereby to realize the control of the QoS such as the priority or the bandwidth or performance limit.

Here, this embodiment has been described on the example of constitution, in which the manager sets the switch management unit 103 of the virtualization switch 100 with the QoS management table 500 and the volume management table 600 through the management terminal 118, as described hereinbefore. However, the setting of that table is not limited to the aforementioned method. The configuration may be modified such that the management terminal 118 itself is created and such that the data of the table created in the virtualization switch 100 is then copied.

Here will be described the method for creating the data of the table in the management terminal 118.

Figure 16:
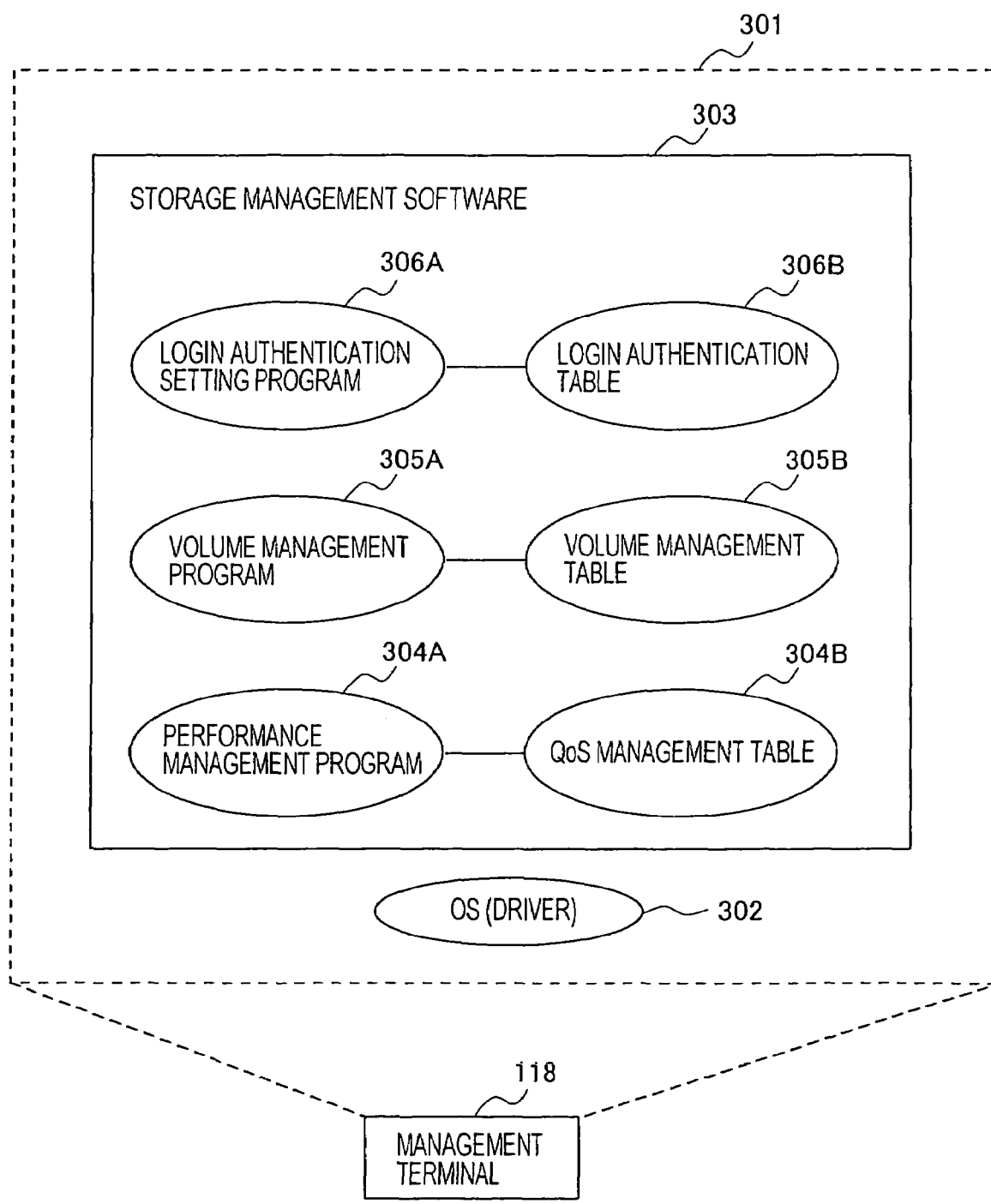
FIG. 16 is a diagram which explains representative programs and a table of a management terminal.

FIG. 16 is a diagram showing representative programs to be stored in the (not-shown) main memory of the management terminal 118 and a table to be used for executing the individual programs.

As shown in FIG. 16, the main memory of the management terminal 118 is provided with an OS 302 and a storage management software 303. This storage management software 303 is provided with a login authentication program 306A, its login authentication table 306B, a volume management program 305A, its volume management table 305B, a performance management program 304A, and its QoS management table 340B.

Figure 17:
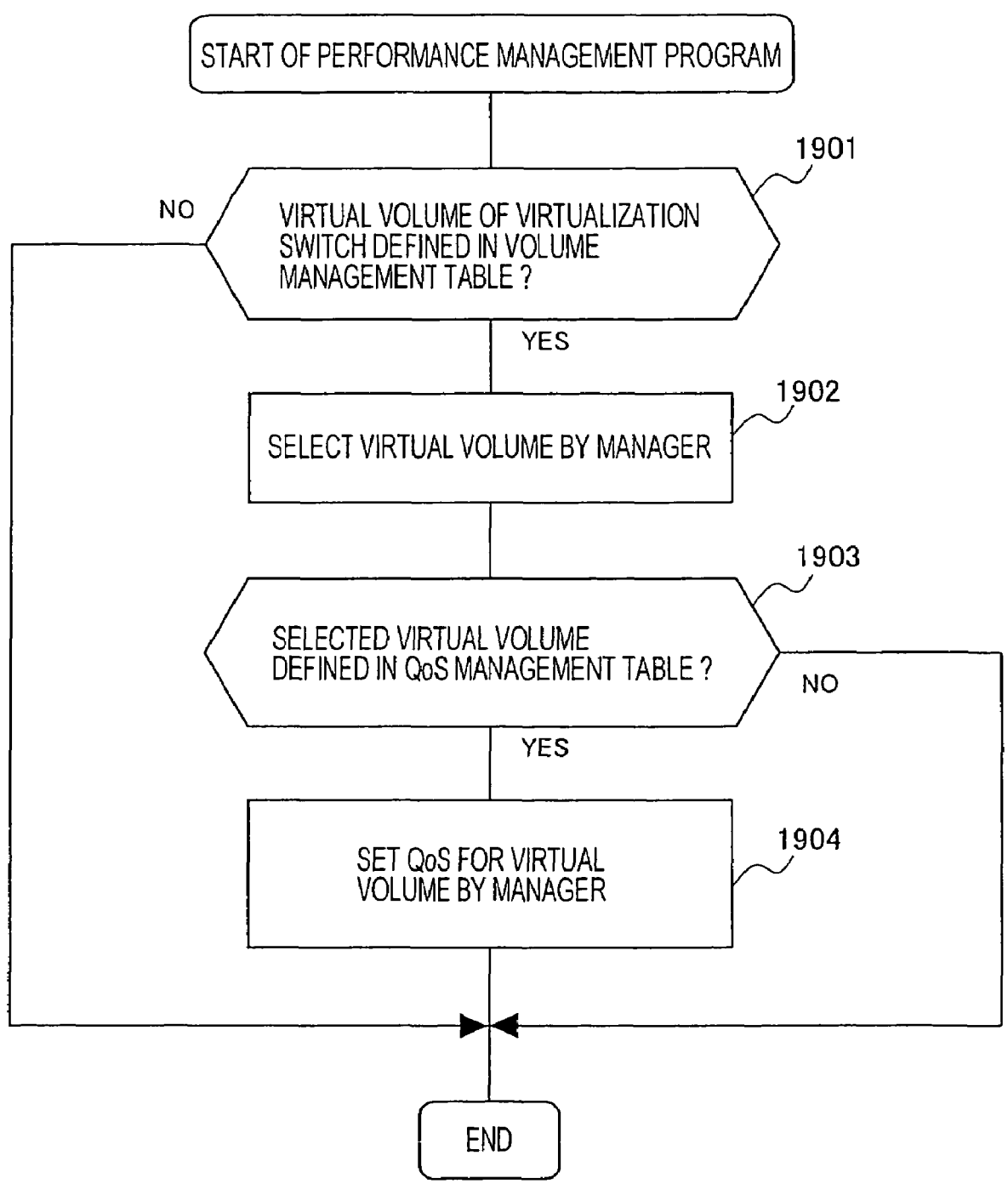
FIG. 17 is a processing flow of a performance management program.

Here will be described the method for setting the QoS management table 500 (304B), for example, in the management terminal 118 in accordance with an instruction coming from the manager. This method is realized such that the CPU (hereinafter, called to as the "CPU 118c") of the management terminal 118 executes the performance management program 304A. FIG. 17 shows a processing flow of this routine.

The CPU 118c of the management terminal 118 examines (at Step 1901) whether or not the virtual volume of the virtualization switch 100 is defined in the volume management table 600. In case the definition is made, the defined virtual volume is presented to the manager, and the instruction from the manager is awaited.

When the selection of the virtual volume and the instruction of the QoS to be set in the selected virtual volume are received (at Step 1902), the CPU 118c retrieves the virtual volume ID 504 of the QoS management table 500 with the key of the ID registered in the virtual volume ID 601A of the volume management table, and examines (at Step 1903) whether or not the virtual volume having accepted the selecting instruction from the manager is defined in the QoS management table 500.

In case the virtual volume is defined, the QoS 503 is set (at Step 1904) on the basis of the QoS for the virtual volume having accepted the selecting instruction from the CPU manager, and the routine is ended. After this, the CPU 118c transmits the set QoS management table 500 to the switch management unit 103.

The routine is ended in case the virtual volume of the virtualization switch 100 is not defined in the volume management table 600 (at Step 1901) or in case the selected virtual volume is not defined in the QoS management table 500 (at Step 1903).

Here in this embodiment, the QoS is not guaranteed for the virtual volume having no definition in the QoS management table 500, although the volume management table 600 is defined.

In the case of the configuration set from the management terminal 118, e.g., in the case having the plural virtualization switches 100, these virtualization switches 100 can be set altogether in the management terminal 118.

Moreover, this embodiment has been described on the case, in which the virtualization switch 100 for the virtualization is interposed between the server device 105 and the storage system 106. As has been described hereinbefore, however, the virtualization should not be limited to the case, in which it is performed in the switch interposed between the server device 105 and the storage system 106. This embodiment can also be applied to the configuration, in which the system is not provided with the virtualization switch 100 so that the virtualization is carried out in the storage system 106.

Figure 18:
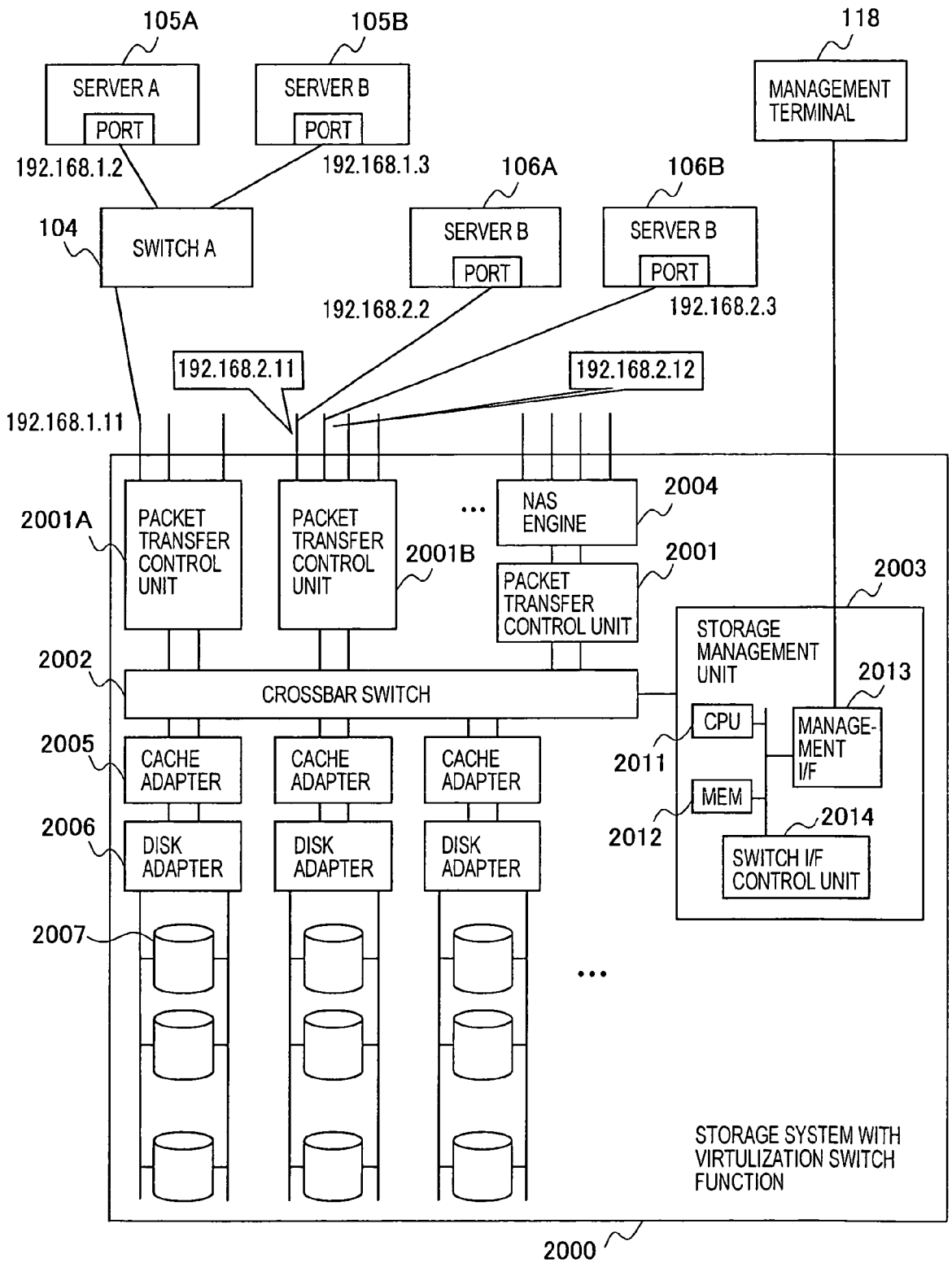
FIG. 18 is a diagram showing a configuration diagram of a storage system having a virtualizing function.

FIG. 18 shows the entire configuration of the system of the case, in which the storage system 106 has the configuration of the virtualization switch 100 of FIG. 1.

This system is provided with a storage system 2000 having a virtualization switch function, in place of the virtualization switch 100 of this embodiment. The remaining points are similar to those of the configuration of FIG. 1.

Here will be described an RAID (Redundant Arrays of Inexpensive (or Independent) Disks) system as the storage system 200.

As shown in FIG. 18, the storage system 2000 is provided with packet transfer control units 2001, 2001A and 2001B having a plurality of ports for connecting the switches 104, the servers 105, the storage systems 106 and so on, disk adapters 2006 for making accesses to a plurality of storage system 2007, cache adapters 2005 having cache memories, a switch management unit 2003, a crossbar switch 2002 for connecting the packet transfer control units 2001, the switch management unit 2003 and the cache adapters 2005.

In case the storage system 2000 has the NAS (Network Attached Storage) function, a NAS engine 2004 having a plurality of ports is connected with the packet transfer control units 2001, 2001A and 2001B. Moreover, the packet transfer control units 2001, 2001A and 2001B, the cache adapters 2005 and the disk adapters 2006 may be provided in plurality.

The switches 104, the servers 105 and the storage systems 106 to be connected with the storage system 2000 have a connection configuration like that of the virtualization switch 100 of FIG. 1.

Moreover, the packet transfer control unit 2001 and the switch management unit 2003 provided with the storage system 2000 have individually similar configurations of the same components provided with the virtualization switch 100 of FIG. 1. Moreover, the packet transfer control unit 2001A has a configuration corresponding to that of the packet transfer control unit (at the reception time) 101A, and the packet transfer control unit 2001B has a configuration corresponding to that of the packet transfer control unit (at the transmission time) 101B.

In the storage system 2000 of the system having the configuration of FIG. 18, the functions described with reference to the aforementioned Figure are realized, and the control of the QoS at the unit of the virtual volume is realized between the server 105 and the storage system 106.

Figure 21:
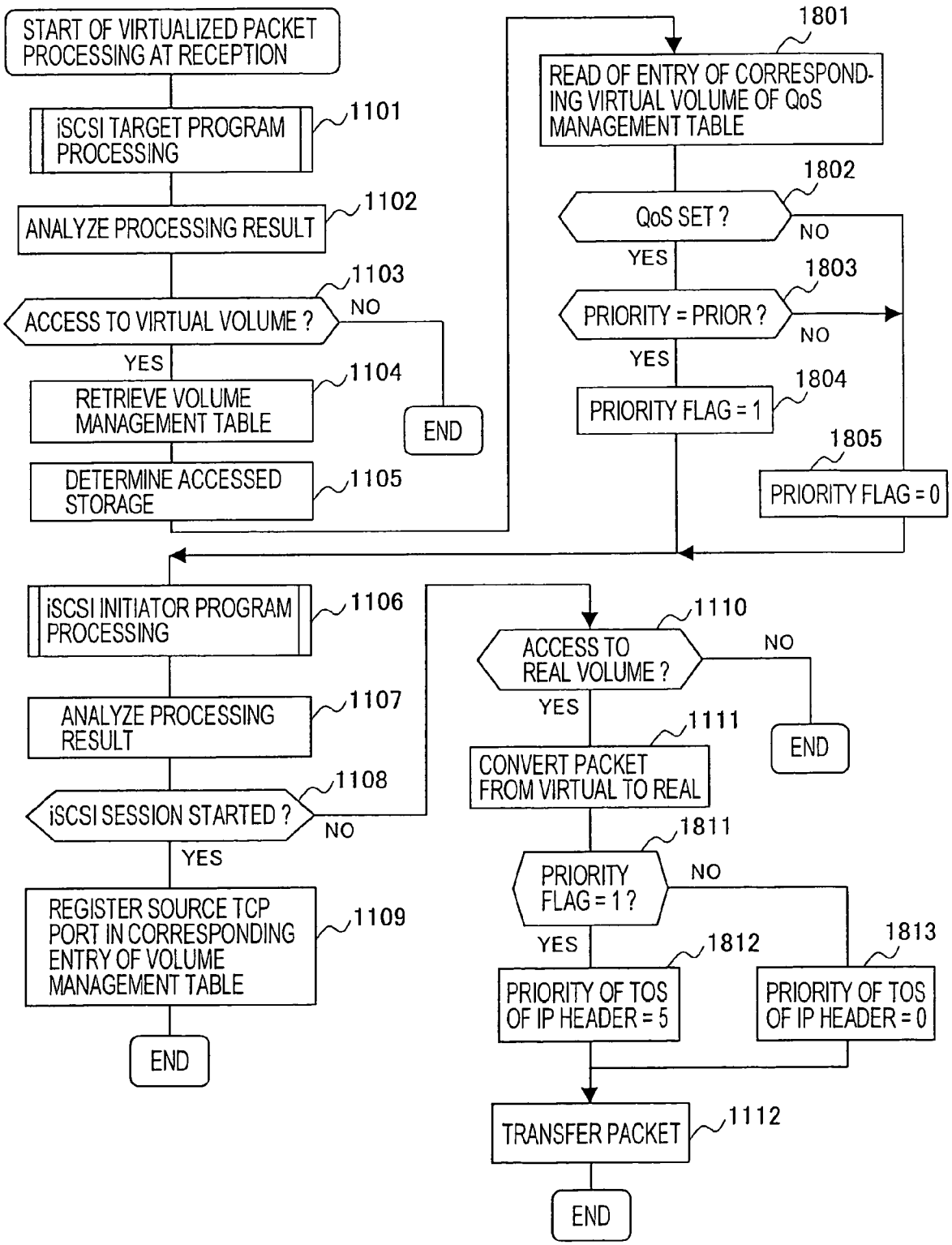
FIG. 21 is a processing flow of a virtualized packet processing unit and a QoS control unit of the second embodiment.

The second embodiment will be described with reference to FIG. 19 to FIG. 21. In the first embodiment, the QoS is designated at each server device 105. In the second embodiment, however, the priority is given to each virtual volume. Here in the virtualization switch 100, the QoS for only the priority control is controlled at the unit of the virtual volume. In the following, the description will be made only on a configuration different from that of the first embodiment.

In this embodiment, the filtering processing is performed at the transmission time with the priority set in the TOS (Type of Service) of the IP header and by the destination port of the TCP header.

The filtering table at the transmission time is set with the relation between the QoS set in the QoS management table 500 and the TOS. Specifically, the case of the "priority" is set with 5 (i.e., a high priority), and the case of "nonpriority" is set with 0 (i.e., a low priority).

A first description of this embodiment will be made on the routine for creating the transmission time filtering table 800. This processing flow of this routine is shown in FIG. 19. The following routine is performed as in the first embodiment such that the CPU 115 executes the QoS management program 202E.

The routine from the processing steps 1601 to 1604 is similar to the described one from the processing steps 1501 to 1504 of FIG. 15. Subsequently, the "priority" is set in the condition of the TOS of the IP header in case the priority 503A of the corresponding entry of the QoS management table 500 is the "priority" (at Step 1605). Specifically, the matching condition 801 of the transmission time filtering table 800 is set (at Step 1606) with the priority of the TOS of the IP header and the condition of the destination port of the TCP header.

In case the entry 506A is extracted, for example, the matching condition 801 is set with the "(Priority of TOS of IP Header=5 (High Priority) AND (Destination Port of TCP Header=3260)".

In case the priority 503A of the corresponding entry of the communication management table 500 is not "priority" at Step 1605, on the other hand, the low priority of 0 is set as the condition of the TOS of the matching condition 801 of the transmission time filtering table 800. Specifically, the matching condition 801 is set (at Step 1606) with "(Priority of TOS of IP Header=0 (Low Priority) AND (Destination Port of TCP Header=3260)", and the routine at and after the processing Step 1607 is performed.

Then, the processing 802 is set (at Step 1607) with the QoS 503 of the QoS management table 500, and the processing ID 803 is set (at Step 1608). The set processing ID 803 is also set in the filtering processing (at the transmission time) 505B of the QoS management table 500.

In the case of another storage IP address 603 of the corresponding virtual volume of the volume management table 600 (at Step 1609), the IP address is selected (at Step 1612), and the routine at and after Step 1605 is performed. As in the first embodiment, the routine from Step 1605 to Step 1612 is repeated by the number of the IP addresses registered as the storage IP address 603.

The routine is ended in case the QoS 503 is not set (at Step 1602) in the corresponding entry of the QoS management table 500 and in case the filtering processing 505B is registered (at Step 1603).

Figure 19:
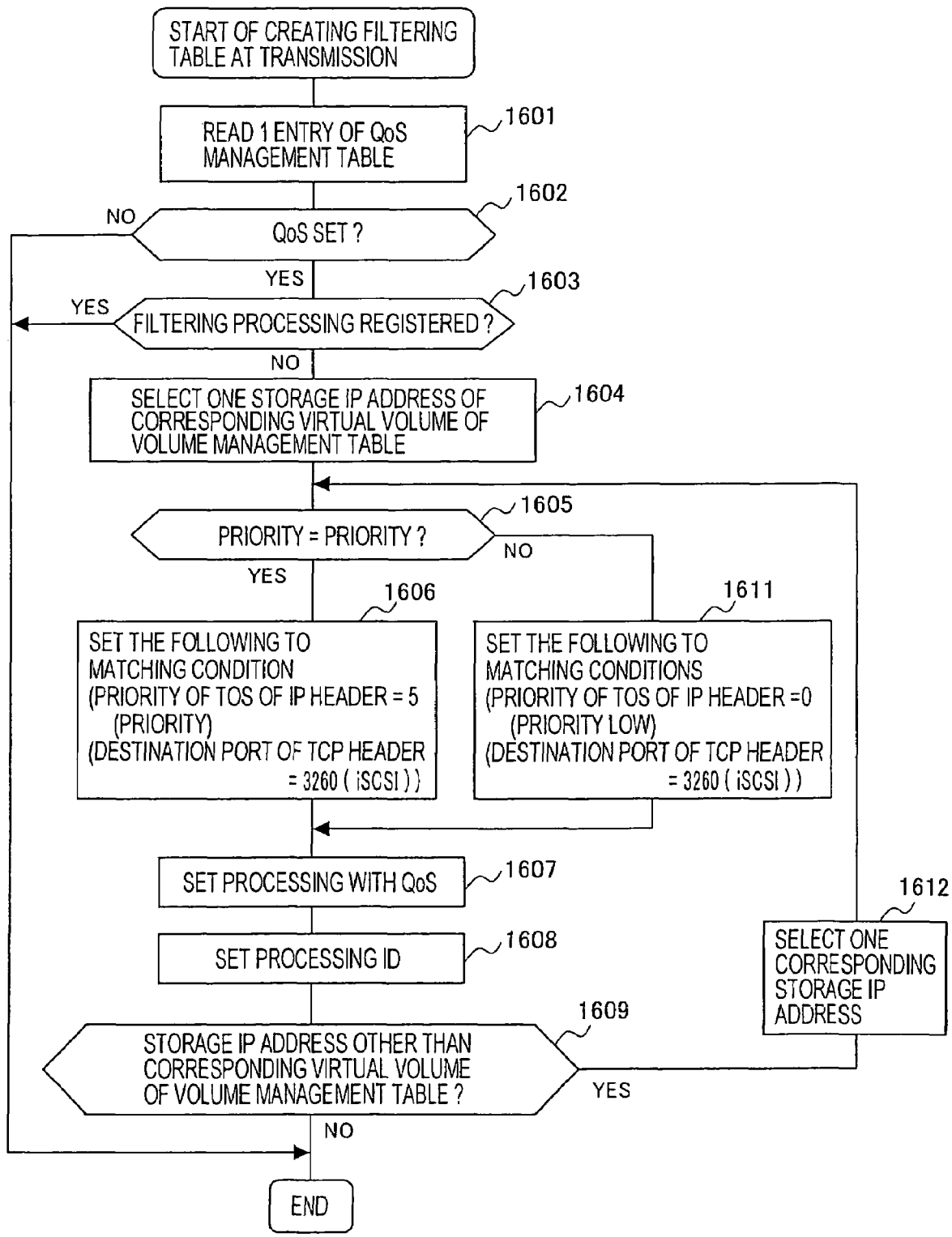
FIG. 19 is a processing flow which creates a filtering table at the transmission time of a second embodiment.

FIG. 20 is a diagram showing a configuration example of the transmission time filtering table 800 to be created by the processing flow shown in FIG. 19. The transmission time filtering table 800 of this embodiment is provided with the entries 1701A and 1701B, which have contents different from those of the entries 804A, 804B, 804C and 804D of the transmission time filtering table 800 shown in FIG. 8.

Figure 11:
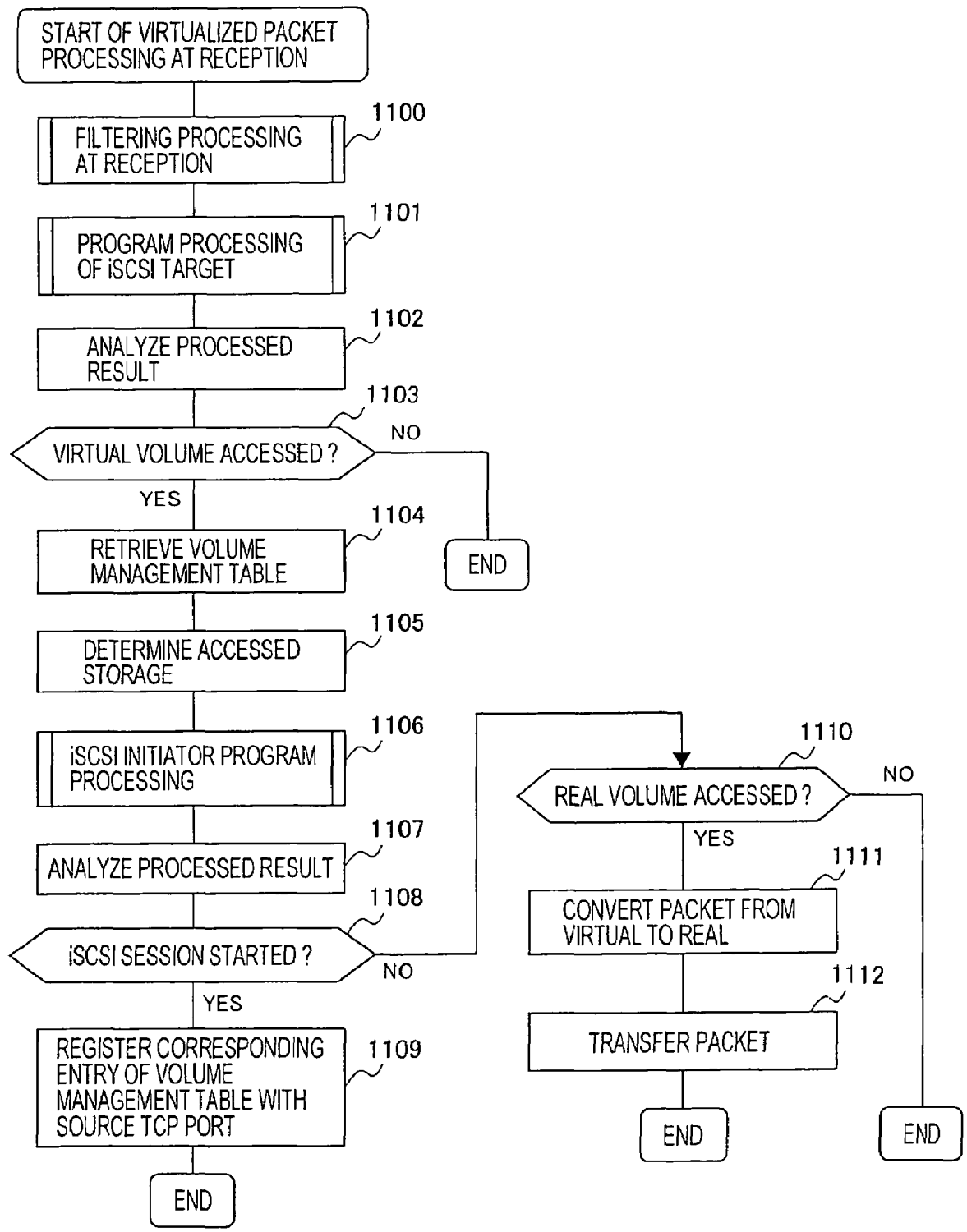
FIG. 11 is a processing flow of a virtualized packet processing unit and the QoS control unit at the reception time.

Here will be described the processings of the virtualized packet processing unit 110 and the subsequent QoS control unit 111 of the packet transfer control unit (at the reception time) 101 of the first embodiment shown in FIG. 11. FIG. 21 is a flow of this routine. The same processings as those of FIG. 11 are designated by the common step numbers.

Here, the following routine is realized such that the QoS management program 202E is executed by the CPU 113.

Subsequent to the processing step 1105, the virtualized packet control unit 110 reads (at Step 1801) the entry of the corresponding virtual volume of the QoS management table 500. In case the QoS 503 is set in the read entry (at Step 1802), the virtualized packet processing unit 110 confirms the setting of the priority 503A (at Step 1803).

In case the priority 503A is the "priority", the virtualized packet processing unit 110 sets the priority flag or a variable in the aforementioned program to 1 (at Step 1804), and the routine at and after the processing Step 1106 is carried out.

In case the QoS 503 is not set at Step 1802 and in case the QoS 503A is not the "priority" at Step 1803, the virtualized packet control unit 110 sets the priority flag or the variable in the aforementioned program to 0 (at Step 1805), and the routine at and after the processing Step 1106 is carried out.

In case the priority flag is at 1 (at Step 1811) subsequent to the processing Step 1111, on the other hand, the priority of the TOS of the IP header of the received packet is set to 5, and the routine at and after the processing Step 1112 is carried out. In case the priority flag is not 1 (at Step 1811), the priority of the TOS of the IP header of the packet is set to 0, and the routine at and after the processing Step 1112 is carried out.

In this embodiment, as has been described hereinbefore, the QoS can also be controlled at the unit of the virtual volume although only with the priority control. As compared with the first embodiment, this embodiment cannot perform the bandwidth control but can reduce the contents of the matching condition 801 of the transmission time filtering table 800 thereby to raise the speed of the retrieval. This embodiment has been described on the case of utilizing the priority of the TOS of the IP header of the packet, but is not limited thereto. For example, it is possible to utilize the priority in the VLAN tag in place of the priority of the TOS of the IP header.

This embodiment may also be configured such that the storage system 106 has the function of the virtualization switch 100.

Here will be described a third embodiment with reference to the accompanying drawing. In this embodiment, the filtering table to be used in the virtualization switch 100 is used in other switches 104, too, to guarantee the QoS of the entire network.

Figure 22:
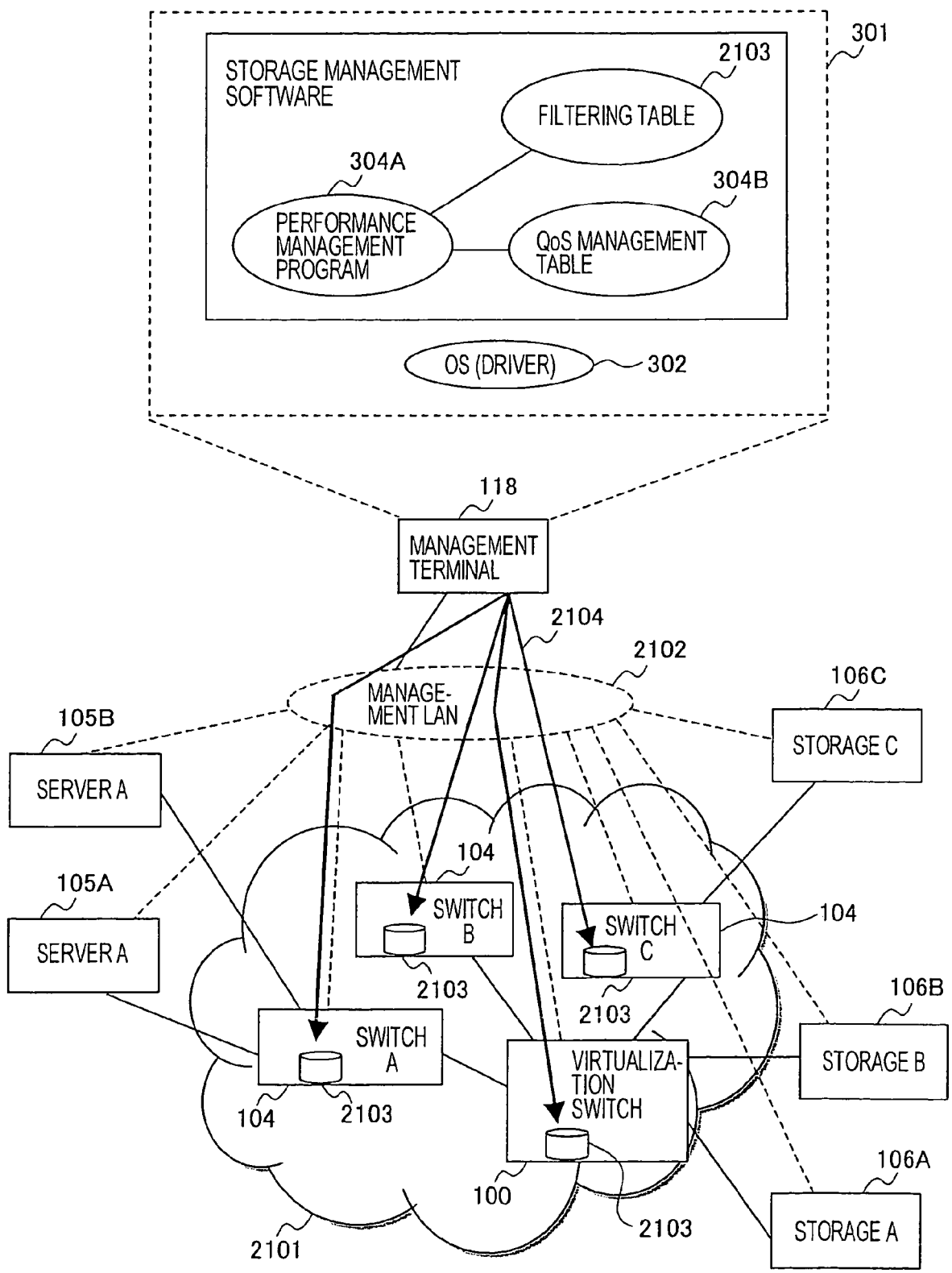
FIG. 22 is a configuration diagram of a system of a third embodiment.

FIG. 22 is a configuration diagram of the system of this embodiment.

As shown in FIG. 22, the system of this embodiment is provided with a managing management LAN in addition to the example of the network configuration of the system shown in FIG. 1, and the management terminal 118 is connected with the system through the management LAN. A SAN network 2101 and a management LAN 2102 are different networks.

In this embodiment, the reception time filtering table 700 and the transmission time filtering table 800, which are provided with the virtualization switch 100 in the first embodiment, are set or distributed in other switches.

In this embodiment, the performance management program 304A of the management terminal 118 creates not only the QoS management table 304B shown in FIG. 16 but also the filtering table 2103. The performance management program 304A of the management terminal 118 is created by using the filtering tables 700 and 800 as a filtering table 2103, and is set or distributed in the virtualization switch 100 and the switches 104 through the management LAN 2102. The setting or distributing flows are indicated by an arrow 2104 in FIG. 22.

Here, the filtering tables 700 and 800 need be neither set nor distributed among all the switches 104. In a configuration, for example, only the reception time filtering table 700 may be set or distributed between the switch A (104) and the switch B (104) between the virtualization switch 100 and the server device 105, and only the transmission time filtering table 800 may also be set or distributed in the switch C (104) between the virtualization switch 100 and the storage C (106C).

The reception time filtering table 700 and the transmission time filtering table 800 are set or distributed among the management terminal 118, the virtualization switch 100 and the switches 104. Therefore, it is possible to use the protocol such as the SNMP (Simple Network Management Protocol).

Here, the foregoing embodiments have been described on the case, in which the protocol of the network is exemplified by the iSCSI, but the protocol should not be limited thereto. The invention can be likewise applied to the case of a fibre channel, for example.

According to the first, second and third embodiments thus far described, the QoS can be controlled at the unit of the virtual volume all over such system.

Even in case the virtualization is done by the intermediate system connected between the server and the storage system, the QoS can be controlled at the unit of the virtual volume.

What is claimed is:

1. A virtualization switch which relays a packet received from a server device to a plurality of storage systems, each storage system comprising a plurality of storage devices storing data and virtualizing a plurality of logical volumes, each logical volume related to said storage devices of said storage systems and providing said server device with a plurality of virtual volumes, each virtual volume related to one or more said logical volumes, comprising:
    a first packet transfer control unit connected with said server system;
    a second packet transfer control unit connected with said one or more storage systems; and
    a network which connects said first and second packet transfer control units,
    wherein said first packet transfer control unit comprises:
        a plurality of ports connected with said server device;
        a processor which controls said first packet transfer control unit; and
        a memory,
    wherein said second packet transfer control unit comprises:
        a plurality of second ports connected with said one or more storage systems;
        a second processor which controls said second packet transfer control unit; and
        a second memory,
    wherein said memory and said second memory store, for each said server device, a QoS management table storing a relationship between said virtual volumes, one or more first ports related to said each virtual volume, and a level of QoS related to said each virtual volume, said QoS management table holding the corresponding relation between the virtualized data storage area (hereinafter, called to as the "virtual volume") to be provided for said server device and said data storage area (hereinafter, called to as the "real volume") assigned to said virtual volume and provided by said storage system, and, for each virtual volume, a filtering table which makes correspondence between a processing (hereinafter, called to as "QoS processing") to guarantee the QoS assigned to said virtual volume and demanded by said server device and flow identifying information identifying the flow of said packet to make an access to said real volume assigned to said virtual volume,
    wherein the processor of said first packet transfer control unit: performs a first QoS processing on the packet received by any of said ports based on a level of QoS, which is stored in the Qos management table and corresponds to one of said virtual volumes as the destination of said packet, in unit of each of the virtual volumes basis before changing the destination of said packet from one of said virtual volumes into one of said logical volumes, in accordance with the QoS demanded by said server device on the source side; changes the destination of said packet from said virtual volume into a real volume by using said volume management table; and transmits said packet having the changed destination to said second packet transfer control unit through said network, and
    wherein the second processor of said second packet transfer control unit performs a second QoS processing on the packet received from said first packet control unit based on the level of QoS, which is stored in the Qos management table and corresponds to one of said virtual volumes as the destination of said packet, in unit of each of the virtual volumes basis for said received packet in accordance with said filtering table, and transmits said processed packet to said storage system through any of said plural second ports.

2. A virtualization switch according to claim 1,
    wherein said volume management table comprises, for each said virtual volume, a source side port ID and a source side connection ID which designate an access route at the time when an access is made to the storage system providing the real volume assigned to said virtual volume, and a port ID of the port of said storage system for the access to said real volume, and
    wherein said flow identifying information in said filtering table comprises said source side port ID, said source side connection ID, and a port ID and a source side port ID of said storage system.

3. A virtualization switch according to claim 2,
    wherein the network protocol between said server device and said storage system is an iSCSI, and
    wherein said source side port ID and the port ID of said storage system are individual IP addresses whereas said source side connection ID is a TCP port number.

4. A virtualization switch according to claim 3,
    wherein said memory and said second memory store, for each server device on the source side, QoS management table holding the demanded QoS,
    said filtering table has a first filtering table used by said first packet transfer control unit, and a second filtering table used by said second packet transfer control unit, and said processor and said second processor create, with information held in said QoS management table and said volume management table, said filtering table and said second filtering table, wherein said first packet transfer control unit transmits said packet to said second packet transfer control unit by using said first filtering table and by performing said QoS processing, and wherein said second packet transfer control unit transmits said packet to said one or more storage systems by using said second filtering table and by performing said QoS processing.

5. A virtualization switch according to claim 4, wherein said QoS includes a processing priority of the case, in which an access is made from said plural server devices to a virtual port defined for said virtual volume, and a bandwidth or an I/O (Input/Output) number per unit time.

6. A system comprising:

one or more server devices;

one or more storage systems, each storage system comprising a plurality of storage devices storing data; and a switch which relays packets sent from said server devices to said storage systems and which virtualizes a plurality of logical volumes, each logical volume related to said storage devices of said storage systems and provides said server devices with a plurality of virtualized volumes, each virtual volume related to said logical volumes, wherein said switch comprises:
 a first packet transfer control unit connected with said server system;
 a second packet transfer control unit connected with said one or more storage systems; and
 a network which connects said first and second packet transfer control units, wherein said first packet transfer control unit comprises:
 a plurality of ports connected with said server device;
 a processor which controls said first packet transfer control unit; and
 a memory, wherein said second packet transfer control unit comprises:
 a plurality of second ports connected with said one or more storage systems;
 a second processor which controls said second packet transfer control unit; and
 a second memory, wherein said memory and said second memory store, for each said server device, a QoS management table storing a relationship between said virtual volumes, one or more first ports related to said each virtual volume, and a level of QoS related to said each virtual volume, said QoS management table holding the corresponding relation between the virtualized data storage area (hereinafter, called to as the "virtual volume") to be provided for said server device and said data storage area (hereinafter, called to as the "real volume") assigned to said virtual volume and provided by said storage system, and, for each virtual volume, a filtering table which makes correspondence between a processing (hereinafter, called to as "QoS processing") to guarantee the QoS assigned to said virtual volume and demanded by said server device and flow identifying information identifying the flow of said packet to make an access to said real volume assigned to said virtual volume, wherein said one or more server devices transmit packets which make an access to a virtual volume provided by said switch for said server devices to said switch, wherein the processor of said first packet transfer control unit: performs a first QoS processing on said packet received by any of said ports based on a level of Qos, which is stored in the QoS management table and corresponds to one of said virtual volumes as the destination of said packet, in unit of each of the virtual volumes basis before changing the destination of said packet from one of said virtual volumes into one of said logical volumes; changes the destination of said packet from said virtual volume into a real volume by using said volume management table; and transmits said packet having the changed destination to said second packet transfer control unit through said network, wherein the second processor of said second packet transfer control unit performs a second QoS processing for said received packet from said first packet control unit based on the level of QoS, which is stored in the QoS management table and corresponds to one of said virtual volumes as the destination of said packet, in unit of each of the virtual volumes basis in accordance with said filtering table, and transmits said processed packet to said storage system through any of said plural second ports, and wherein such one of said one or more storage systems as has received said packet reads or writes the data in accordance with the contents of a command contained in the received packet.

7. A system according to claim 6, further comprising:

a management terminal connected with said switch, wherein said management terminal comprises:
 an input acceptance unit which accepts an input from a manager;
 a QoS management table creation unit which creates the QoS management table holding the information on the QoS demanded by said server device, for each said source side server device in accordance with an instruction accepted from the manager through said input acceptance unit; and
 a transmission unit which sends said created QoS management table to said switch.

8. A system according to claim 7, further comprising:

one or more second switches which relay the packet sent from said server device to said storage system, wherein said management terminal further comprises a filtering table creation unit which creates a filtering table using said QoS management table, and wherein said transmission unit sends said created filtering table to said switch and said second switches.

9. A system according to claim 8, wherein said volume management table comprises, for each said virtual volume, a source side port ID and a source side connection ID which designate an access route at the time when an access is made to the storage system providing the real volume assigned to said virtual volume, and a port ID of the port of said storage system for the access to said real volume, and wherein said flow identifying information in said filtering table comprises said source side port ID, said source side connection ID, a port ID of said storage system and a source side port ID.

10. A system according to claim 9, wherein the network protocol between said server device and said storage system is an iSCSI, and wherein said source side port ID and the port ID of said storage system are individual IP addresses whereas said source side connection ID is a TCP port number.

11. A system according to claim 10, wherein said memory and said second memory store, for each server device on the source side, a QoS management table holding the demanded QoS, wherein said processor and said second processor create said filtering table using the information held in said QoS management table and said volume management table.

12. A system according to claim 11,.

wherein said QoS includes a processing priority of the case, in which an access is made from said plural server devices to a virtual port defined for said virtual volume, and a bandwidth or an I/O (Input/Output) number per unit time.

13. A storage system which relays a packet received from a server device to a plurality of storage systems, each storage system comprising a plurality of storage devices storing data and virtualizing a plurality of logical volumes, each logical volume related to said storage devices of said storage systems and providing said server device with a plurality of virtual volumes, each virtual volume related to said logical volumes, comprising:

a first packet transfer control unit connected with said server device;

a second packet transfer control unit connected with said one or more storage systems;

a plurality of disk devices;

a control unit which controls said plural disk devices; and a network which connects said plural packet transfer control units and said control unit, wherein said first packet transfer control unit comprises:
a plurality of ports connected with said server device;
a processor which controls said first packet transfer control unit; and
a memory, wherein said second packet transfer control unit comprises:
a plurality of second ports connected with said one or more storage systems;
a second processor which controls said second packet transfer control unit; and
a second memory, wherein said memory and said second memory store, for each said server device, a QoS management table storing a relationship between said virtual volumes, one or more first ports related to said each virtual volume, and a level of QoS related to said each virtual volume, said Qos management table holding the corresponding relation between the virtualized data storage area (hereinafter, called to as the "virtual volume") to be provided for said server device and said data storage area (hereinafter, called to as the "real volume") assigned to said virtual volume and provided by said storage system, and, for each virtual volume, a filtering table which makes correspondence between a processing (hereinafter, called to as "QoS processing") to guarantee the QoS assigned to said virtual volume and demanded by said server device and flow identifying information identifying the flow of said packet to make an access to said real volume assigned to said virtual volume, wherein the processor of said first packet transfer control unit: performs a first QoS processing on the packet received by any of said ports based on a level of QoS, which is stored in the QoS management table and corresponds to one of said virtual volumes as the destination of said packet, in unit of each of the virtual volumes basis before changing the destination of said packet from one of said virtual volumes into one of said logical volumes, in accordance with said filtering table; changes the destination of said packet from said virtual volume into a real volume by using said volume management table; and transmits such one of said packets having the changed destinations as to be transferred to said one or more storage systems, to said second packet transfer control unit through said network, and wherein the second processor of said second packet transfer control unit performs a second QoS processing on the packet received from said first packet control unit based on the level of QoS, which is stored in the QoS management table and corresponds to one of said virtual volumes as the destination of said packet, in unit of each of the virtual volumes basis for said received packet in accordance with said filtering table, and transmits said processed packet to said one or more storage systems through any of said plural second ports.

14. A storage system according to claim 13, wherein said QoS is the processing priority of the case, in which an access is made from said plural server devices to a virtual port defined for said virtual volume, and is set in a TOS (Type of Service) field or a VLAN (Virtual LAN) tag in the IP (Internet Protocol) header of said packet, and wherein said flow identifying information in said filtering table is defined by said reception side connection ID, and said TOS or said VLAN.

15. A storage system according to claim 13, wherein said volume management table comprises, for each said virtual volume, a source side port ID and a source side connection ID which designate an access route at the time when an access is made to the storage system providing the real volume assigned to said virtual volume, and port IDs of the ports of said storage systems for the access to said real volume, and wherein said flow identifying information in said filtering table comprises said source side port ID, said source side connection ID, and a port ID and a source side port ID of said storage system.

16. A storage system according to claim 15, wherein the network protocol between said server device and said one or more storage systems is an iSCSI, and wherein said source side port ID and the port IDs of said storage systems are individual IP addresses whereas said source side connection ID is a TCP port number.

17. A storage system according to claim 16, wherein said memory and said second memory store, for each server device on the source side, a QoS management table holding the demanded QoS, wherein said processor and said second processor create said filtering table using the information held in said QoS management table and said volume management table.

18. A storage system according to claim 17, wherein said QoS comprises a processing priority of the case, in which an access is made from said plural server devices to a virtual port defined for said virtual volume, and a bandwidth or an I/O (Input/Output) number per unit time.

19. A virtualization switch which relays a packet received from a server device to a plurality of storage systems, each storage system comprising a plurality of storage devices storing data and virtualizing a plurality of logical volumes, each logical volume related to said storage devices of said storage systems and providing said server device with a plurality of virtual volumes, each virtual volume related to said logical volumes, comprising:

a first packet transfer control unit connected with said server device;

a second packet transfer control unit connected with said one or more storage systems; and a network which connects said first and second packet transfer control units, wherein said first and second packet transfer control units comprises, for each said server device, first information which indicates the corresponding relation between the virtualized data storage area (hereinafter, called to as the "virtual volume") to be provided for said server device and said data storage area (hereinafter, called to as the "real volume") assigned to said virtual volume and provided by said storage system, and, for each virtual volume, second information which makes correspondence between a processing (hereinafter, called to as "QoS processing") to guarantee the QoS assigned to said virtual volume and demanded by said server device and flow identifying information identifying the flow of said packet to make an access to said real volume assigned to said virtual volume, wherein said first packet transfer control unit: selects and performs a first QoS processing corresponding to said server device on the packet received by any of said ports based on a level of Qos, which is stored in the QoS management table and corresponds to one of said virtual volumes as the destination of said packet, in unit of each of the virtual volumes basis before changing the destination of said packet from one of said virtual volumes into one of said logical volumes; changes the destination of said packet from said virtual volume into a real volume by using said volume management table; and transmits said packet having the changed destination to said second packet transfer control unit through said network, and wherein said second packet transfer control unit selects and performs a second QoS processing on the packet received from said first packet control unit based on the level of QoS, which is stored in the QoS management table and corresponds to one of said virtual volumes as the destination of said packet, in unit of each of the virtual volumes basis for said received packet on the basis of said second information, and transmits said processed packet to said storage system through any of said plural second ports.

20. A virtualization switch according to claim 19, wherein said second information contains third information to be used by said first packet transfer control unit and fourth information to be used by said second packet transfer control unit, wherein said first packet transfer control unit selects said QoS corresponding to said server device for the packet received by any of said plural ports, on the basis of said third information, and wherein said second packet transfer control unit selects said QoS for said received packet in accordance with said fourth information.

* * * * *